(12) United States Patent
Mizuta et al.

(10) Patent No.: US 6,337,905 B1
(45) Date of Patent: Jan. 8, 2002

(54) SYSTEM FOR CONTROLLING AUTOMATIC CALL DISTRIBUTION SERVICE

(75) Inventors: Kazuo Mizuta; Miwa Kususe; Masataka Mukaihara, all of Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/469,126

(22) Filed: Dec. 21, 1999

(30) Foreign Application Priority Data

Jan. 20, 1999 (JP) .......................................... 11-012408

(51) Int. Cl.$^7$ ........................ H04M 3/523; H04M 3/22; G06F 17/60; G06G 7/62
(52) U.S. Cl. ............................. 379/265.02; 379/32.01; 379/266.01; 703/13; 705/8; 705/10
(58) Field of Search .......................... 379/34, 265, 266, 379/309, 32.01, 265.01, 265.02, 266.01; 703/13; 705/8, 9, 10

(56) References Cited

U.S. PATENT DOCUMENTS

| | | | |
|---|---|---|---|
| 4,951,310 A | 8/1990 | Honda et al. | 379/266 |
| 5,652,791 A * | 7/1997 | Sunderman et al. | 379/265 |
| 6,044,355 A * | 3/2000 | Crockett et al. | 379/34 X |

FOREIGN PATENT DOCUMENTS

| | | |
|---|---|---|
| JP | 3-147468 | 6/1991 |
| JP | 5-68105 | 3/1993 |
| JP | 8-65723 | 3/1996 |

* cited by examiner

*Primary Examiner*—Harry S. Hong
(74) *Attorney, Agent, or Firm*—Rosenman & Colin LLP

(57) ABSTRACT

A system for controlling automatic call distribution service in a network in which call processing systems are connected via a control channel and a communication channel includes a pseudo-ACD-call-placement requesting unit which sends a request for pseudo-ACD-call placement from a control station to satellite stations via the control channel, wherein the control station is one of the call processing systems that receives a call from an exterior of the network, and satellite stations are the call processing systems other than the control station, a pseudo-ACD-call-placement-request accepting unit which accepts the request at the satellite stations so that a pseudo-ACD call is placed in queue in the satellite stations, and an inter-station-communication-path establishing unit which establishes a communication path via the communication channel between the control station and one of the satellite stations when the one of the satellite stations has an available receiver to respond to the pseudo-ACD call placed in the queue thereof.

15 Claims, 36 Drawing Sheets

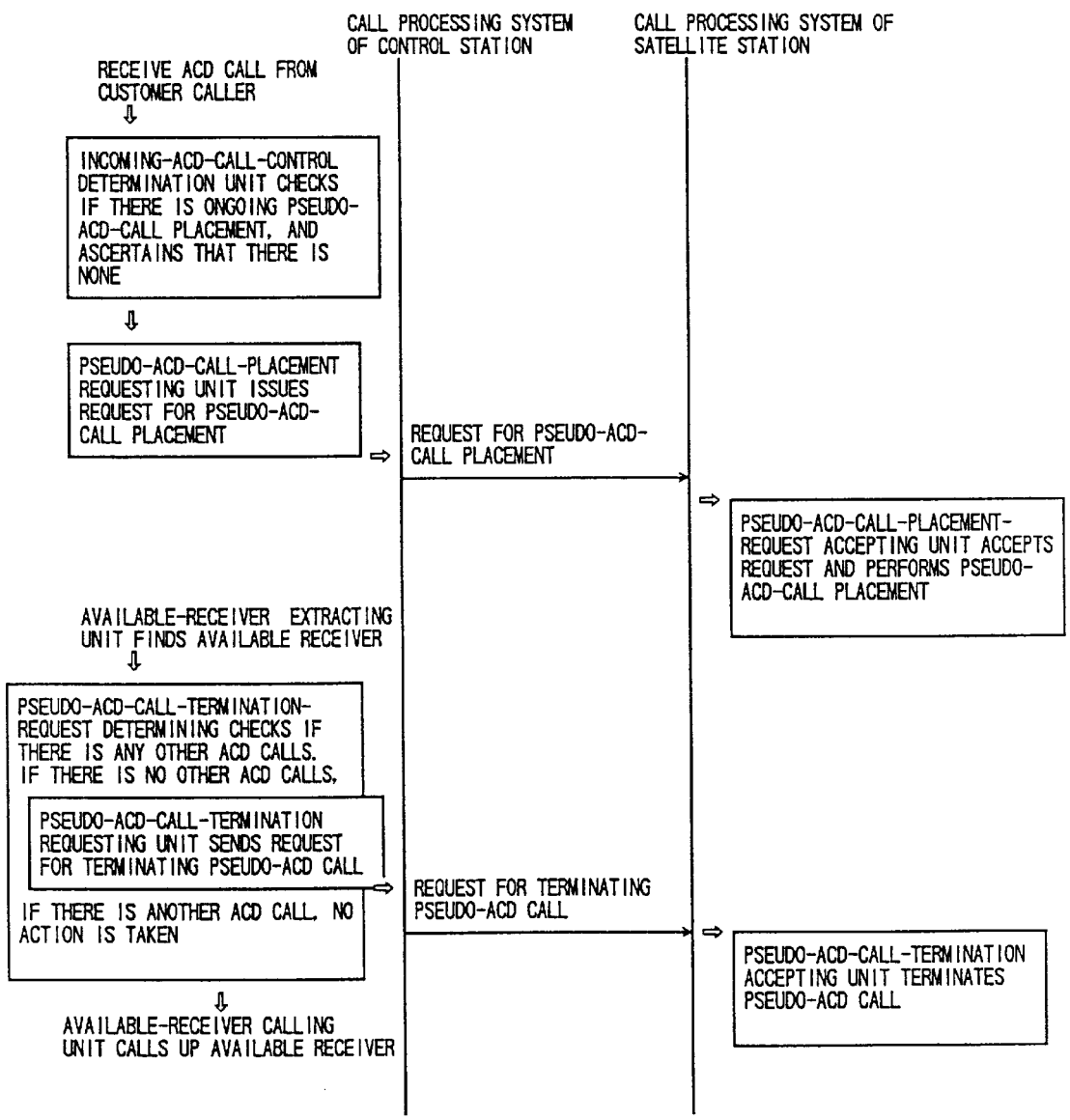
F I G. 10

F I G. 1 1
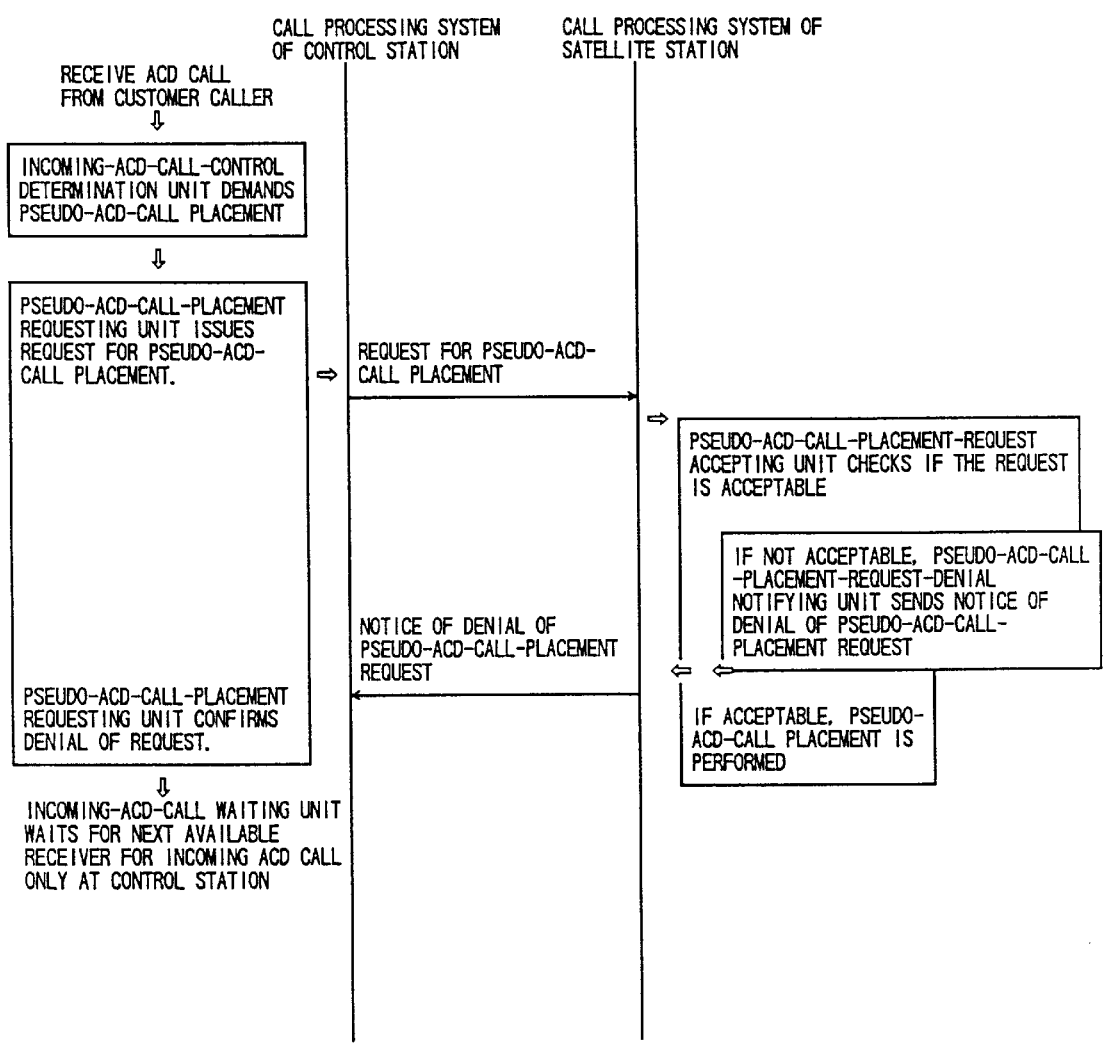

※1 : UNIT USED FOR IDENTIFYING
OBJECT STATION
ACD GROUP NUMBER

ACD PILOT NUMBER
CALLER IDENTIFICATION
SYSTEM                ETC.

※2 : INFORMATION ON OBJECT TO
RECEIVE REQUEST
PSEUDO-ACD-CALL-PLACEMENT
PILOT NUMBER
PSEUDO-ACD-CALL-PLACEMENT
GROUP NUMBER

FIG. 18

```
CALL RECEIVING NODE INFORMATION
ACD PILOT NUMBER
ACD GROUP NUMBER
CALLER IDENTIFICATION
INFORMATION ON OBJECT TO RECEIVE PSEUDO-
   ACD-CALL-PLACEMENT REQUEST
                  :
                  :
                                        e. t. c.
```

F I G. 2 0
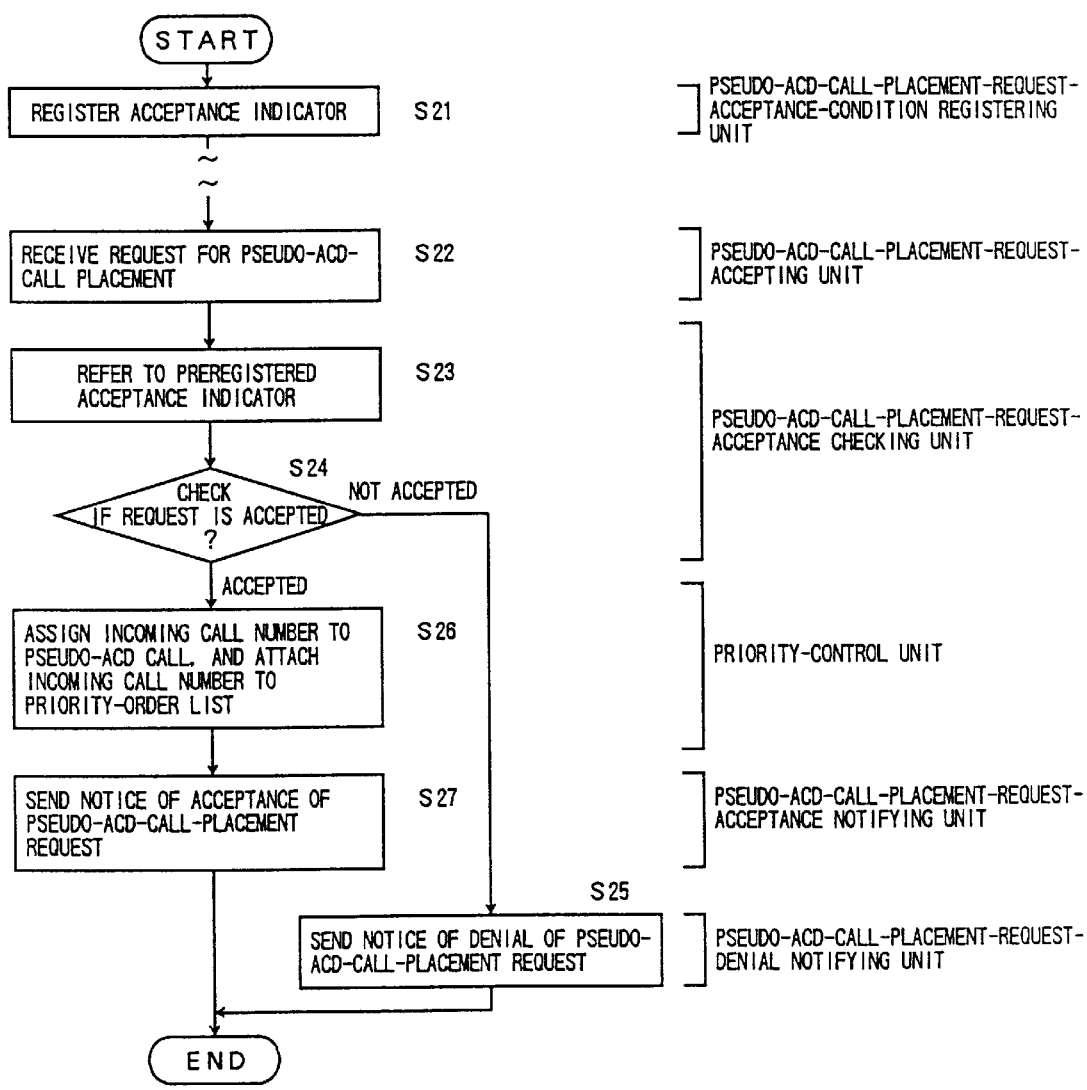

F I G. 3 0

```
CALL RECEIVING NODE INFORAMTION
PSEUDO-ACD-PILOT INFORMATION
PSEUDO-ACD-GROUP INFORMATION
CALLER IDENTIFICATION
CONTROL STATION INFORMATION
ACD PILOT INFORMATION
ACD GROUP INFORMATION
         :
         :
                        e. t. c.
```

SYSTEM FOR CONTROLLING AUTOMATIC CALL DISTRIBUTION SERVICE

BACKGROUND OF THE INVENTION

1. Field of the Invention

The present invention generally relates to a method of controlling an automatic call distribution service, and particularly relates to a system for controlling an automatic call distribution service that automatically distributes incoming calls to available receivers.

2. Description of the Related Art

Automatic call distribution (ACD) service automatically distributes incoming calls to available receivers (i.e., telephone terminals) so as to achieve an efficient telephone reception service in the tele-marketing business, the claim handling, or the like. A system provided with such an ACD service is used in a call center, a tele-marketing system, or the like.

In the ACD service, receivers together make up a group, which collectively handles incoming calls and transmitting calls. When a call is received, it is automatically distributed to an available one of the receivers so as to establish a connection. In general, the ACD service employs a plurality of receivers to distribute the load, and operates the receivers in such a manner as to handle a large number of calls efficiently by use of a limited number of receivers. A basic mode of operation of the ACD service is to handle incoming calls on a first-in-and-first-out basis. If all the receivers are busy handling incoming calls, a caller is let wait until a next available receiver can answer the call. During a waiting period, an announce or the like is played to the caller.

FIG. 1 is an illustrative drawing for explaining an ACD service of a standalone type used in related-art call processing system.

In FIG. 1, call processing systems 10a, 10b, and 10c are each connected to a public network via a public communication line. In the ACD service of a standalone type, the call processing systems 10a, 10b, and 10c control a plurality of receivers belonging to respective ACD groups 11a, 11b, and 11c. The call processing system 10a, for example, automatically distributes incoming calls to the receivers of the ACD group 11a, thereby spreading out the load of the call handling.

When a call is coming from a caller 12a to the call processing system 10a, the call processing system 10a puts the incoming call in queue. If there is an available receiver among the receivers of the ACD group 11a, the caller 12a is connected to this available receiver. If there is no available receiver in the ACD group 11a, the caller 12a is let wait until a next available receiver can be connected.

In recent years, many corporations have adopted an ACD service of a network type. In this ACD service, a plurality of call processing systems are connected via a network, and the load is distributed among all the ACD groups belonging to the network, thereby reducing a time period during which customers have to wait before being connected.

FIG. 2 is an illustrative drawing for explaining an ACD service of a network type used in a related-art call processing system.

In FIG. 2, call processing systems 20a, 20b, and 20c are each connected to a public network via a public communication line, and are connected with each other.

There are several schemes for distributing the load among ACD groups within the network and reducing a waiting period of customers. One of such schemes is called a look-ahead-routing scheme.

According to this scheme, when a call is coming to a given call processing system, this call processing system inquires other call processing systems about an estimated waiting period during which the call should wait before being connected. Here, an estimated waiting period is obtained based on statistics of waiting periods for the previously received calls. Based on the estimates obtained upon inquiries, a decision is made as to which ACD group should receive the incoming call in its queue. For example, when a call is coming to an ACD group 21a of the call processing system 20a as shown by an arrow (1), the ACD group 21a may not have an available receiver. In this case, the call processing system 20a inquires the call processing systems 20b and 20c about an estimated waiting period. As a result of inquiries, it may be found that an ACD group 21b of the call processing system 20b has the shortest waiting period (or has an available receiver with a zero waiting period). Then, the incoming call is transferred from the call processing system 20a to the call processing system 20b as shown by an arrow (2), and is put in queue of the call processing system 20b. In this manner, a caller 22a is let wait for a next available receiver in the ACD group 21b, which is expected to respond to the call faster than the ACD group 21a. In this manner, a call coming to the call processing system 20a is handled by utilizing all the resources of the call processing systems 20a, 20b, and 20c, so that a waiting time of customers can be reduced.

Another scheme (second scheme) for distributing the load among ACD groups within a network and reducing a waiting period of customers is disclosed in Japanese Patent Laid-open Application No. 9-294283. In this scheme, a real-time value of a predetermined criterion is subjected to intelligent processing so as to decide which one of the ACD groups should receive the incoming call in its queue. In detail, the predetermined criterion may be an estimate of a waiting time in queue used together with other criteria, and an ACD group able to respond to the call earlier than any other ACD groups is selected. In this manner, a waiting time of customers can be reduced.

Another scheme (third scheme) for distributing the load among ACD groups within a network and reducing a waiting period of customers is disclosed in Japanese Patent Laid-open Application No. 7-170546. This scheme employs a device for centralized control of receivers provided in the network. When a call is coming to a given call processing system, an inquiry is made to the centralized-control device as to which ACD group should receive the call in its queue. Based on the response to the inquiry, an automatic call distribution network controls the destination of the call. In this scheme, a control system that integrates network elements controls distribution of incoming calls to the call processing systems. Namely, the control system tracks availability of all the receivers within the network, and selects a receiver that is faster than any other receivers in responding to an incoming call. Then, the control system sends a routing command to the call processing system so that the call processing system transfer the call to another system according to the routing command. In this manner, a reduction is made in the customer waiting time.

The first and second schemes described above use an estimate of a waiting time in queue as a criterion for selecting an ACD group. It is impossible to predict with certainty which one of the call processing systems provides a next available receiver in the network. It is possible, therefore, to have a situation where a next available receiver for a given call is found in a call processing system after the call is transferred from this call processing system to another system. In this unfortunate scenario, the customer has to wait longer than he/she should have just because his/her call was transferred to another system.

The third scheme described above is required to have a control system for integrating network elements and a centralized-control device for controlling statuses of all the receivers provided in the network. In this configuration, data communication lines are necessary between the centralized-control device and each of the call processing systems in order to transmit information on status of receiver availability as well as routing commands. Namely, an automatic call distribution network cannot be implemented unless data communication lines are laid out. This entails significant investment in facility.

Accordingly, there is a need for a system for controlling an automatic call distribution service which can reduce a waiting time of a caller without incurring additional costs.

SUMMARY OF THE INVENTION

Accordingly, it is a general object of the present invention to provide a system for controlling an automatic call distribution service which can satisfy the need described above.

It is another and more specific object of the present invention to provide a system for controlling an automatic call distribution service which can reduce a waiting time of a caller without incurring additional costs.

In order to achieve the above objects according to the present invention, a system for controlling automatic call distribution service in a network in which call processing systems are connected via a control channel and a communication channel includes a pseudo-ACD-call-placement requesting unit which sends a request for pseudo-ACD-call placement from a control station to satellite stations via the control channel, wherein the control station is one of the call processing systems that receives a call from an exterior of the network, and satellite stations are the call processing systems other than the control station, a pseudo-ACD-call-placement-request accepting unit which accepts the request at the satellite stations so that a pseudo-ACD call is placed in queue in the satellite stations, and an inter-station-communication-path establishing unit which establishes a communication path via the communication channel between the control station and one of the satellite stations when the one of the satellite stations has an available receiver to respond to the pseudo-ACD call placed in the queue thereof.

Other objects and further features of the present invention will be apparent from the following detailed description when read in conjunction with the accompanying drawings.

BRIEF DESCRIPTION OF THE DRAWINGS

FIG. 10 is a sequence chart showing operation of call processing systems and exchange of information between a control station and a satellite station according to a sixth embodiment of the present invention;

FIG. 11 is a sequence chart showing operation of call processing systems and exchange of information between a control station and a satellite station according to a seventh embodiment of the present invention;

FIG. 18 is an illustrative drawing showing ACD-call information;

FIG. 20 is a flowchart of a process performed by a satellite station when the satellite station receives a request for pseudo-ACD-call placement;

FIG. 30 is an illustrative drawing showing the contents of pseudo-ACD-call information;

DESCRIPTION OF THE PREFERRED EMBODIMENTS

In the following, embodiments of the present invention will be described with reference to the accompanying drawings.

Figure 1:
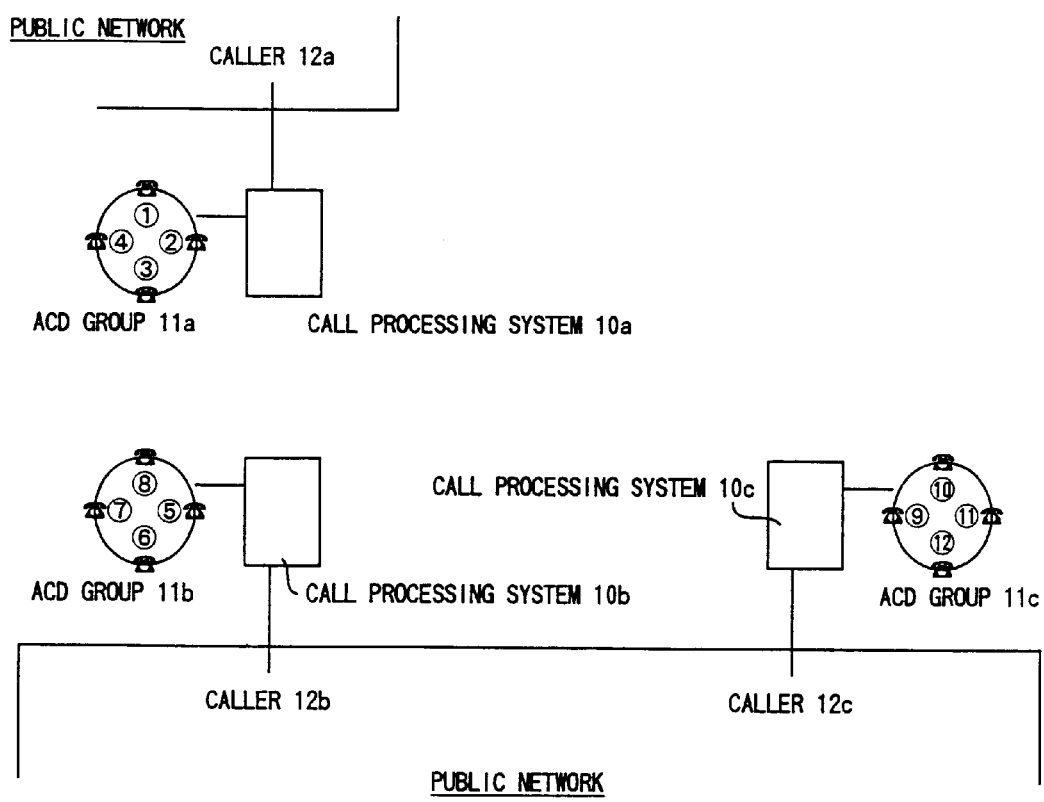
FIG. 1 is an illustrative drawing for explaining an ACD service of a standalone type used in a related-art call processing system.
Figure 2:
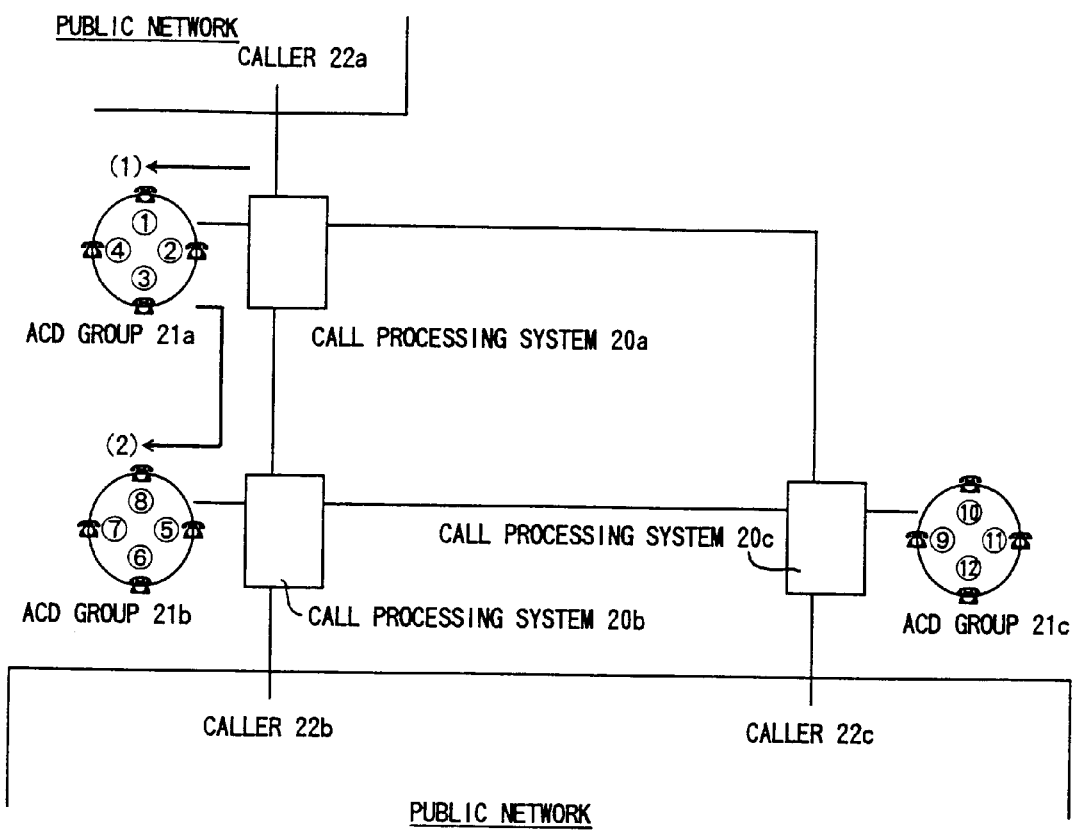
FIG. 2 is an illustrative drawing for explaining an ACD service of a network type used in a related-art call processing system.
Figure 3:
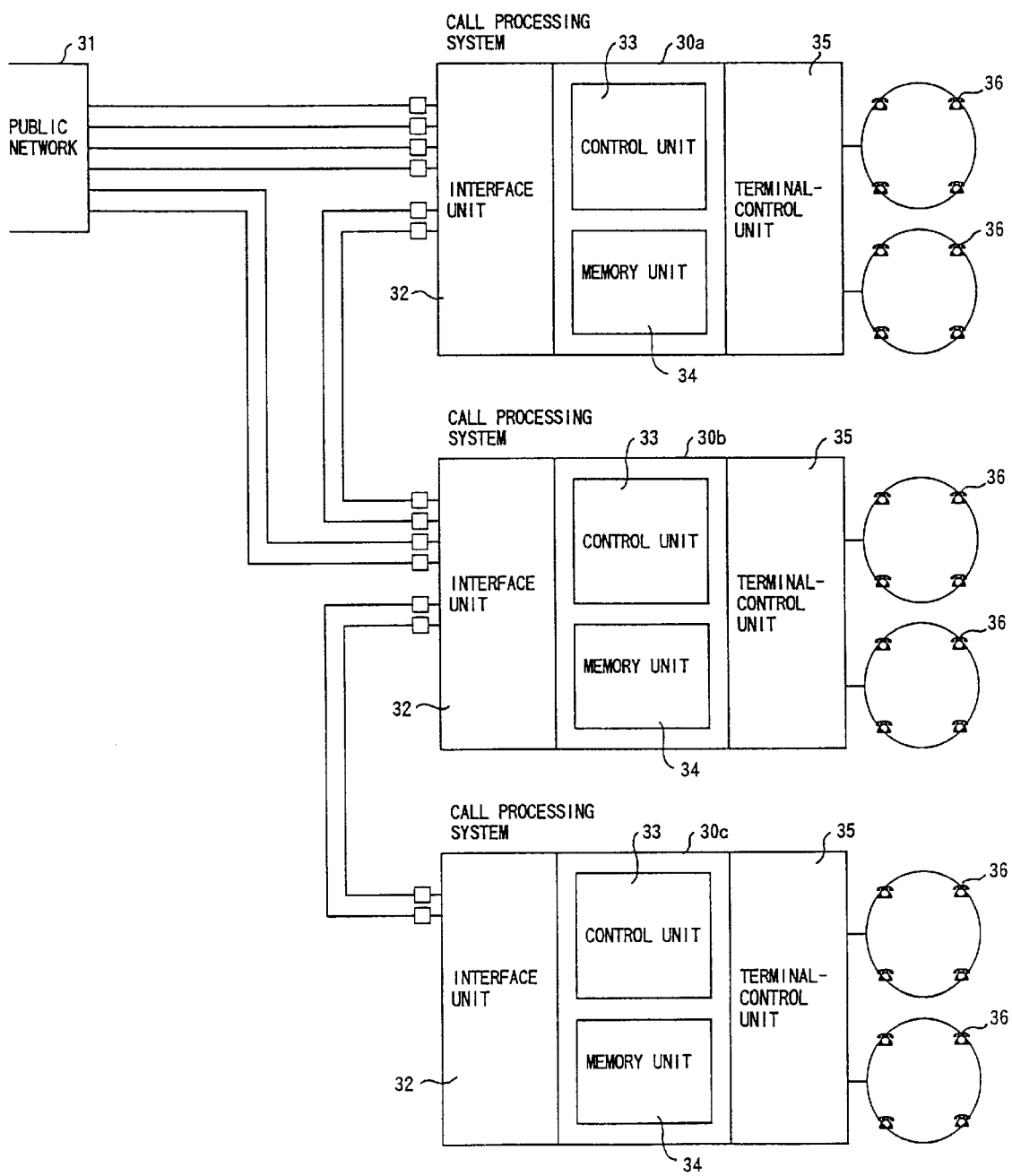
FIG. 3 is a block diagram of an embodiment of a system for controlling automatic call distribution service according to the present invention.

FIG. 3 is a block diagram of an embodiment of a system for controlling an automatic call distribution service according to the present invention.

In FIG. 3, call processing systems 30a and 30b are connected to a public network 31, and are connected with each other. A call processing system 30c is connected to the call processing system 30b. Among the call processing systems 30a, 30b, and 30c, one which detects an ACD call received from the public network 31 is referred to as a control station, and other call processing systems are referred to as satellite stations. Here, the control station is connected to the satellite stations via an ISDN network comprised of a control channel and a communication channel.

Each of the call processing systems 30a, 30b, and 30c includes an interface unit 32, a control unit 33, a memory unit 34, and a terminal-control unit 35. The interface unit 32 is connected to the public network 31 and/or to another call processing system. The interface unit 32 notifies the control unit 33 of received requests, and transmits requests and messages to other call processing systems. The control unit 33 attends to overall control of the call processing system. The memory unit 34 stores information on the call processing system. The terminal-control unit 35 informs the control unit 33 of status transitions of receivers 36, and supplies audio signals to the receivers 36. Namely, the terminal-control unit 35 serves as an interface between the control unit 33 and the receivers 36, and controls the receivers 36.

Figure 4:
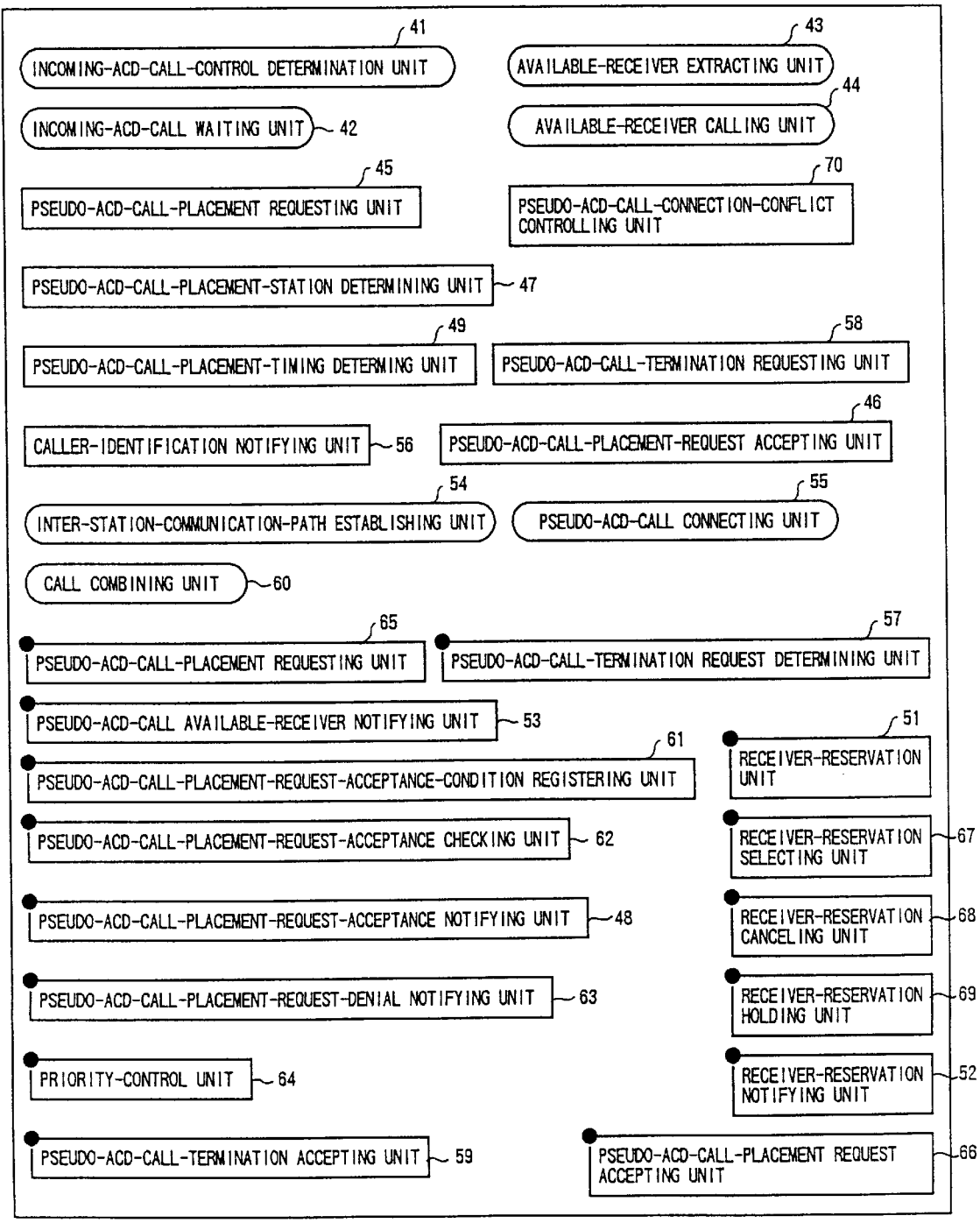
FIG. 4 is a block diagram of a control unit of FIG. 3.

FIG. 4 is a block diagram of the control unit 33. In FIG. 4, a block having rounded corners indicates a function that is common to both the control station and the satellite stations, and a block having sharp corners indicates a function that is necessary only for the control station. Further, a block shown with a black dot at a top-left corner indicates a function that is only necessary for the satellite stations. Hereinafter, a pseudo-ACD-call placement means placing a call in queue of an ACD group or in queue of a call processing system that is capable of processing the call where such placement of the call in queue is achieved without using communication lines between the call processing systems.

In FIG. 4, an incoming-ACD-call-control determination unit 41 determines how to control a received ACD call, which is notified by the interface unit 32 or the terminal-control unit 35. An incoming-ACD-call waiting unit 42 waits for the terminal-control unit 35 to notify that one of the receivers 36 has made a state transition to become an available receiver. An available-receiver extracting unit 43 notifies the terminal-control unit 35 that an available receiver is extracted or is obtained. An available-receiver calling unit 44 instructs the terminal-control unit 35 to arrange that the available receiver is being called by the received ACD call. The units 41 through 44 described here are those used in a conventional system.

A pseudo-ACD-call-placement requesting unit 45 instructs the interface unit 32 to transmit a request for pseudo-ACD-call placement to a satellite station in order to arrange that the satellite station performs an ACD-call placement. A pseudo-ACD-call-placement-request accepting unit 46 accepts a request for pseudo-ACD-call placement received by the interface unit 32. A pseudo-ACD-call-placement-station determining unit 47 selects, based on information obtained from the memory unit 34, a satellite station that performs the pseudo-ACD-call placement.

A pseudo-ACD-call-placement-request-acceptance notifying unit 48 instructs the interface unit 32 to transmit an acceptance of a pseudo-ACD-call-placement request to the control station. A pseudo-ACD-call-placement-timing determining unit 49 determines if a request for the pseudo-ACD-call placement is necessary, and determines a timing of the request. These determinations are made based on information read from the memory unit 34. A receiver-reservation unit 51 instructs the terminal-control unit 35 to set aside an available receiver for future use of the receiver for the purpose of pseudo-ACD-call placement. A receiver-reservation notifying unit 52 instructs the terminal-control unit 35 to notify receivers or callers that a receiver is reserved when they attempt to connect to the reserved receiver. A pseudo-ACD-call available-receiver notifying unit 53 instructs the interface unit 32 to send a notice of a receiver available for pseudo-ACD-call placement to the control station.

An inter-station-communication-path establishing unit 54 instructs the interface unit 32 to establish communication paths with other stations by issuing connection requests to relevant stations in the network. A pseudo-ACD-call connecting unit 55 instructs the interface unit 32 and the terminal-control unit 35 to connect the caller to the reserved receiver. A caller-identification notifying unit 56 instructs the interface unit 32 to include a caller identification in the pseudo-ACD-call-placement request. A call combining unit 60 combines information regarding a plurality of calls to which each connection destination kept in the memory unit 34 is related.

A pseudo-ACD-call-termination-request determining unit 57 determines whether to request termination of a pseudo-ACD call to a satellite station to which the pseudo-ACD-call placement has been requested. A pseudo-ACD-call-termination requesting unit 58 instructs the interface unit 32 to request termination of a pseudo-ACD call to the satellite station. A pseudo-ACD-call-termination accepting unit 59 accepts a request for termination of pseudo-ACD-call placement when the interface unit 32 receives the request.

A pseudo-ACD-call-placement-request-acceptance-condition registering unit 61 stores an indicator in the memory unit 34 to specify whether to accept a request for pseudo-ACD-call placement when the request is received. A pseudo-ACD-call-placement-request-acceptance checking unit 62 determines, based on the conditions, whether to accept the request for pseudo-ACD-call placement. A pseudo-ACD-call-placement-request-denial notifying unit 63 instructs the interface unit 32 to send a denial notice to the control station, denying the request for pseudo-ACD-call placement.

A priority-control unit 64 controls which incoming call is to be given to a receiver when the terminal-control unit 35 reports that this receiver becomes available. A pseudo-ACD-call-placement requesting unit 65 instructs the interface unit 32 to transmit a request for pseudo-ACD-call placement when the terminal-control unit 35 reports that a receiver requests pseudo-ACD-call placement. A pseudo-ACD-call-placement-request accepting unit 66 accepts a request for pseudo-ACD-call placement when the interface unit 32 receives the request, thereby performing another ACD-call placement.

A receiver-reservation selecting unit 67 selects one of the options between holding a reservation and canceling a reservation. A receiver-reservation canceling unit 68 instructs the terminal-control unit 35 to cancel a reservation for a receiver. A receiver-reservation holding unit 69 instructs the terminal-control unit 35 to keep a reservation for a receiver. A pseudo-ACD-call-connection-conflict controlling unit 70 controls handling of reserved receivers of satellite stations when these reserved receivers are not connected to a relevant received ACD call where the interface unit 32 and the terminal-control unit 35 indicate that there are a plurality of available receivers.

In the following, operation of each unit will be described with reference to a call processing system of a control station and a call processing system of a satellite station. Here, the call processing system of a control station issues a pseudo-ACD-call-placement request in response to reception of an ACD call, and the call processing system of a satellite station accepts the pseudo-ACD-call-placement request sent from the control station.

Figure 5A:
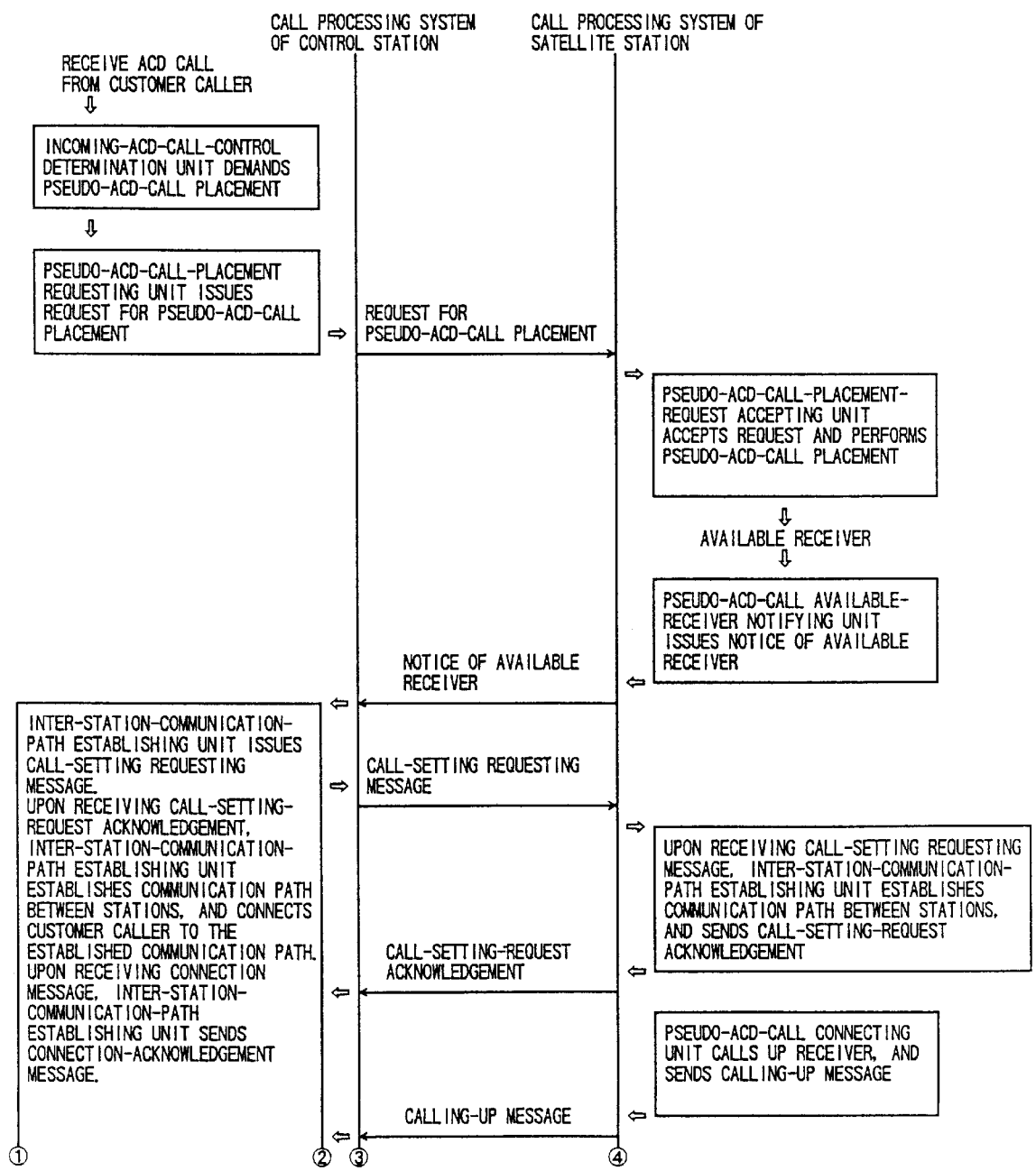
FIGS. 5A and 5B are a sequence chart showing operation of call processing systems and exchange of information between a control station and a satellite station according to a first embodiment of the present invention.
Figure 5B:
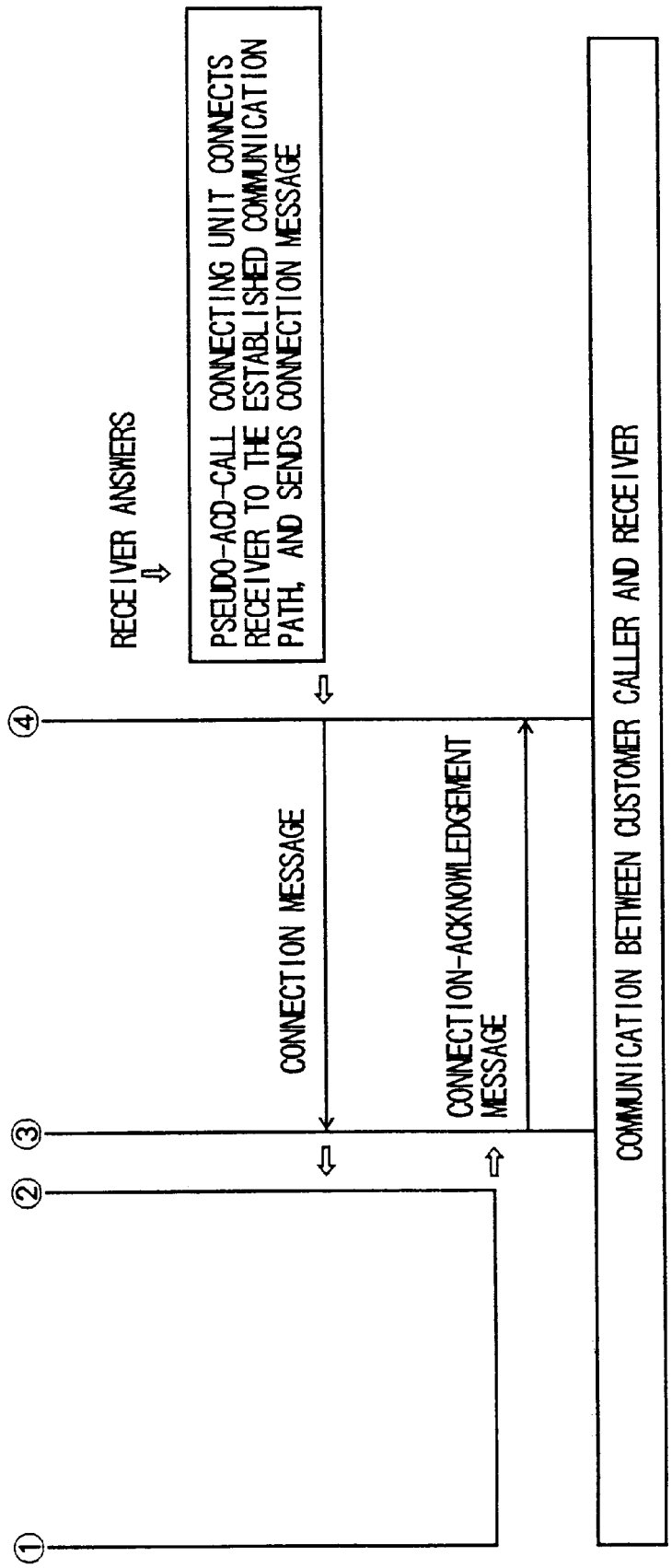

FIGS. 5A and 5B are a sequence chart showing operation of call processing systems and exchange of information between a control station and a satellite station according to a first embodiment of the present invention.

In FIG. 5A, when the call processing system of the control system receives an ACD call from a customer caller, the incoming-ACD-call-control determination unit 41 demands a pseudo-ACD-call placement, and the pseudo-ACD-call-placement requesting unit 45 issues a request for pseudo-ACD-call placement to the call processing system of the satellite station. This request for pseudo-ACD-call placement is transmitted via a path other than audio-communication lines between the call processing system of the control station and the call processing system of the satellite station. Such a path other than audio-communication lines may be a layer-3 message using only a D channel such as an INVOKE message defined in the communication standard TPH-2256 if the call processing system of the control station and the call processing system of the satellite station are connected through ISDN (integrated service digital network).

Having received the request for pseudo-ACD-call placement from the call processing system of the control station, the call processing system of the satellite station uses the pseudo-ACD-call-placement-request accepting unit 66 to perform pseudo-ACD-call placement. When the call processing system of the satellite station has an available receiver, the pseudo-ACD-call available-receiver notifying unit 53 issues a notice of the available receiver to the call processing system of the control station. Transmission of this notice is also carried out via a path other than audio-communication lines between the call processing system of the control station and the call processing system of the satellite station.

In the call processing system of the control station, upon receiving the notice from the call processing system of the satellite station, the inter-station-communication-path establishing unit 54 issues a call-setting requesting message to the call processing system of the satellite station. Here, this message has caller information that indicates a customer caller of the received ACD call, and has destination information that indicates an available receiver reported by the notice. In the call processing system of the satellite station, upon receiving the call-setting requesting message, the inter-station-communication-path establishing unit 54 establishes a communication path between the stations, and sends a call-setting-request acknowledgement to the call processing system of the control system.

In the call processing system of the control system having received the call-setting-request acknowledgement, the inter-station-communication-path establishing unit 54 establishes a communication path between the stations, and connects the customer caller to the established communication path. In this manner, an audio-communication path is created between the call processing system of the control station and the call processing system of the satellite station.

In the call processing system of the satellite station, the pseudo-ACD-call connecting unit 55 calls up the receiver. When the receiver answers, the pseudo-ACD-call connecting unit 55 connects the receiver to the communication path between the stations, and sends a connection message to the call processing system of the control station. In the call processing system of the control station having received the connection message, the inter-station-communication-path establishing unit 54 sends a connection-acknowledgement message to the call processing system of the satellite station. This completes a process of establishing a connection between the customer caller of the control station and the receiver of the satellite station, thereby enabling communication therebetween.

Accordingly, the present invention performs a pseudo-ACD-call placement at the call processing system of the satellite station without using audio-communication path between the system of the control station and the system of the satellite station when the call processing system of the control station receives an ACD call from a customer, so that the receiver of the satellite station can respond to the customer caller. This configuration reduces a waiting time of the customer caller that passes before the caller is responded to, and spreads out the load of call handling over the network without degrading efficiency of the inter-station communication lines.

Figure 6:
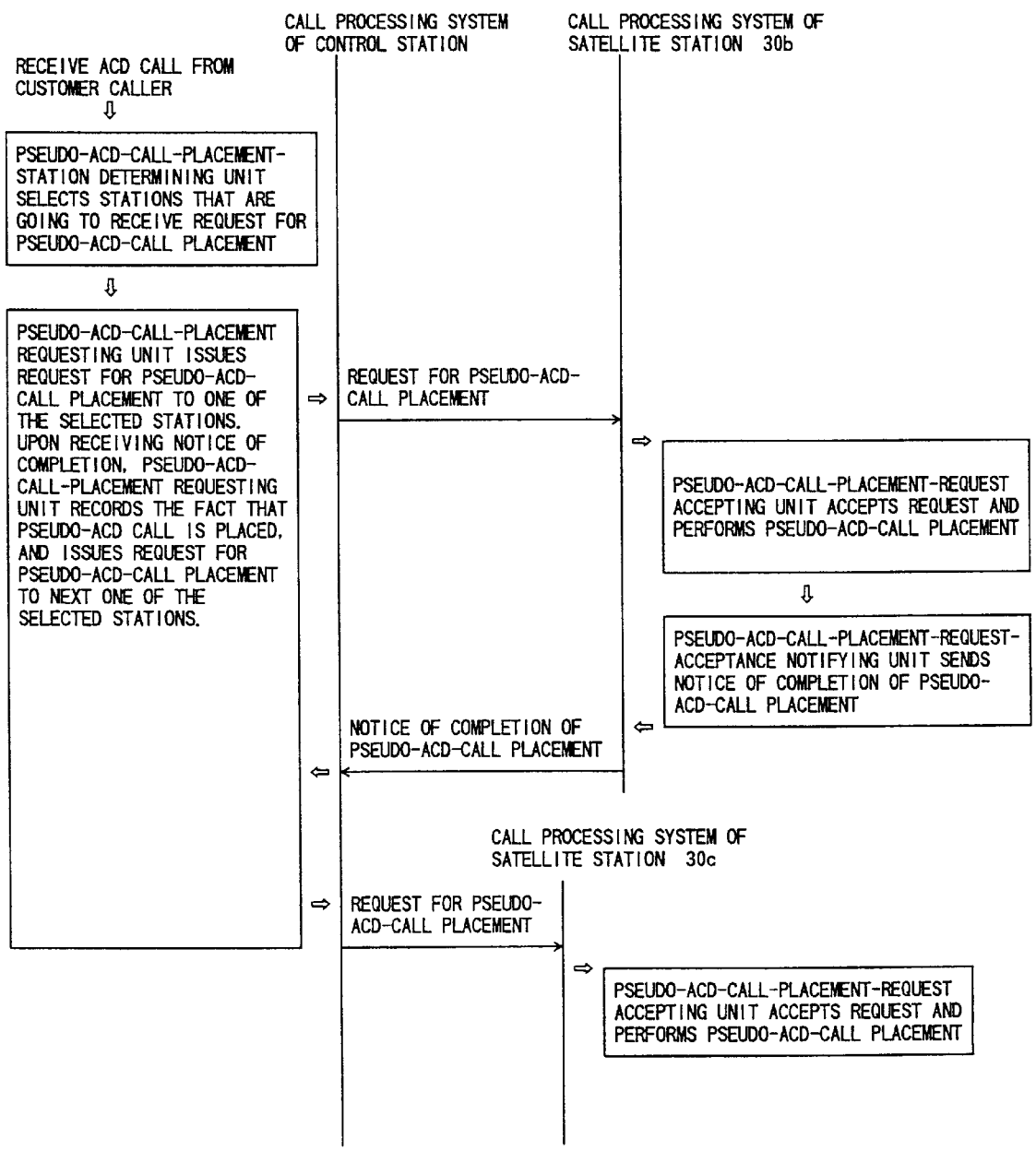
FIG. 6 is a sequence chart showing operation of call processing systems and exchange of information between a control station and a satellite station according to a second embodiment of the present invention.

FIG. 6 is a sequence chart showing operation of call processing systems and exchange of information between a control station and a satellite station according to a second embodiment of the present invention.

In FIG. 6, the call processing system 30*a* serves as a control station, and the call processing systems 30*b* and 30*c* serve as satellite stations.

In the call processing system of the control station, when an ACD call is detected, the pseudo-ACD-call-placement-station determining unit 47 selects stations that are going to be requested to perform pseudo-ACD-call placement. This selection is made based on the number of waiting customers, time, the number of requested pseudo-ACD-call placements, etc. The pseudo-ACD-call-placement requesting unit 45 issues a request for pseudo-ACD-call placement successively with respect to each of the selected stations. If both of the call processing systems 30*b* and 30*c* are selected as a venue to perform pseudo-ACD-call placement, the pseudo-ACD-call-placement requesting unit 45 issues a request for pseudo-ACD-call placement first to the call processing system 30*b* of one of the satellite stations.

In the call processing system 30*b* of the satellite station which received the request for pseudo-ACD-call placement from the call processing system of the control station, the pseudo-ACD-call-placement-request accepting unit 66 performs pseudo-ACD-call placement, and the pseudo-ACD-call-placement-request-acceptance notifying unit 48 sends a notice indicating completion of pseudo-ACD-call placement to the call processing system of the control station. Transmission of this notice is also effected by using a path other than audio-communication lines connecting between the call processing system of the control station and the call processing system of the satellite station.

Upon receiving the notice from the call processing system 30*b* of the satellite station, the call processing system of the control station records the fact that the pseudo-ACD-call placement is performed at the call processing system 30*b* of the satellite station. Thereafter, the pseudo-ACD-call-placement requesting unit 45 issues a request for pseudo-ACD-call placement to the call processing system 30*c* of the remaining one of the satellite stations.

In this manner, the present invention can perform pseudo-ACD-call placement at two or more call processing systems of satellite stations, and pseudo-ACD-call placement can be performed with respect to as many ACD groups as necessary under the control of the control station.

Figure 7:
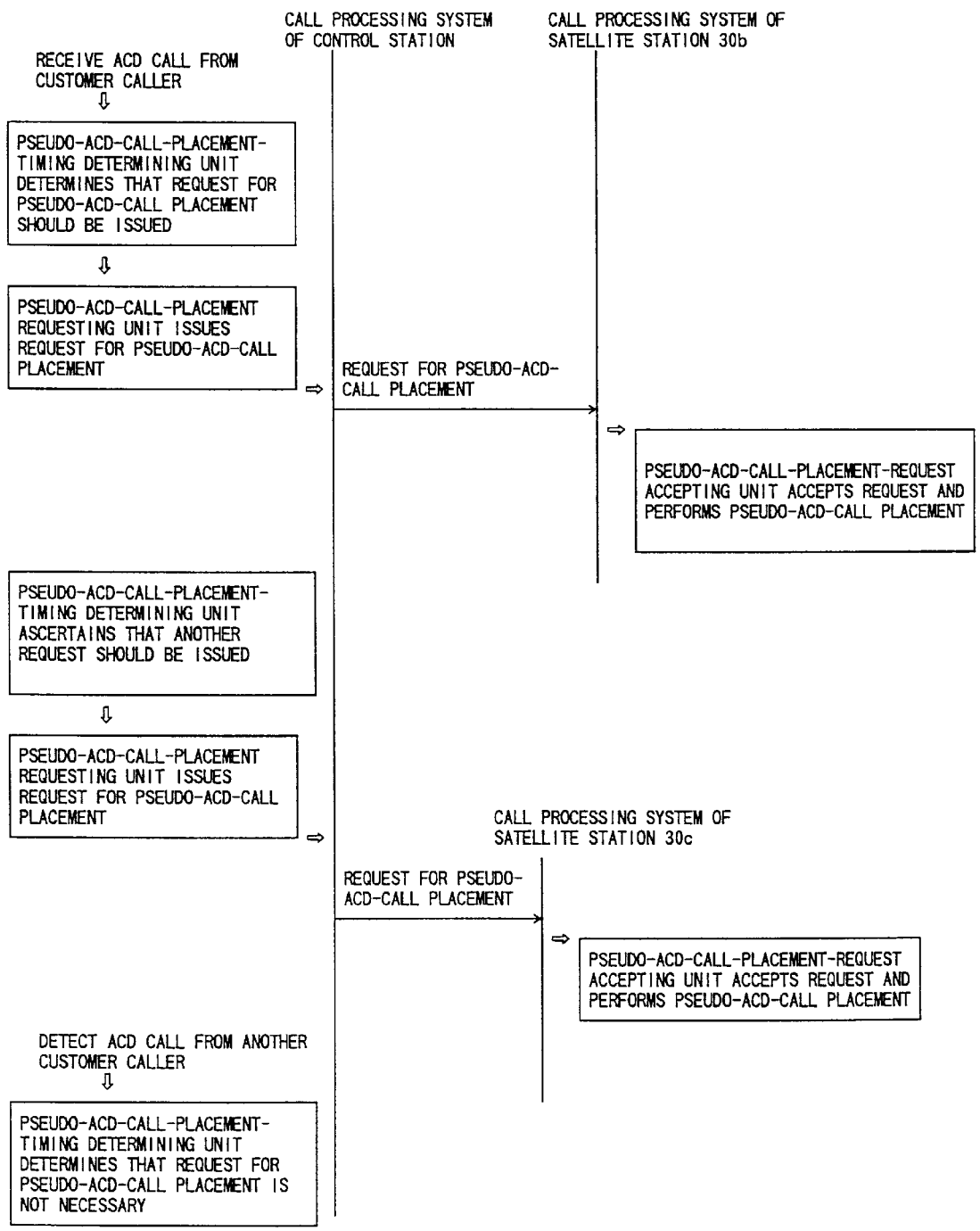
FIG. 7 is a sequence chart showing operation of call processing systems and exchange of information between a control station and a satellite station according to a third embodiment of the present invention.

FIG. 7 is a sequence chart showing operation of call processing systems and exchange of information between a control station and a satellite station according to a third embodiment of the present invention.

In FIG. 7, the call processing system 30*a* serves as a control station, and the call processing systems 30*b* and 30*c* serve as satellite stations.

In the call processing system of the control station, when an ACD call from a customer caller A is detected, the pseudo-ACD-call-placement-timing determining unit 49 determines whether a request for pseudo-ACD-call placement should be issued. If it is determined that the request should be issued, the pseudo-ACD-call-placement requesting unit 45 issues a request for pseudo-ACD-call placement to the call processing system 30*b* of one of the satellite stations.

If the caller is left waiting for more than a predetermined time period after the issue of request, the pseudo-ACD-call-placement-timing determining unit 49 ascertains that another request should be issued. In response, the pseudo-ACD-call-placement requesting unit 45 issues a request for pseudo-ACD-call placement to the call processing system 30*c* of the other one of the satellite stations.

If an ACD call from another customer caller B is detected, the pseudo-ACD-call-placement-timing determining unit 49 determines whether a request for pseudo-ACD-call placement should be issued. If it is determined that the request should not be issued, no request is generated.

As described above, a request for pseudo-ACD-call placement can be issued in response to all the incoming calls.

When a setting is made such that all the incoming calls entail a request for pseudo-ACD-call placement, it is possible to learn the total number of waiting calls present in all the call processing systems in the entire network. Further, call processing systems of all the satellite stations can be arranged to implement pseudo-ACD-call placement in the second embodiment, a first-in-and-first-out operation can be achieved with respect to all the incoming ACD calls arriving at any one of the call processing systems in the network.

Moreover, when a satellite ACD system of a given ACD group is engaged in a pseudo-ACD-call placement and is in a waiting state, a request for pseudo-ACD-call placement may not be issued to this ACD group. In this manner, the number of pseudo-ACD-call placements can be decreased, thereby reducing a processing load associated with the pseudo-ACD-call placements.

Figure 8:
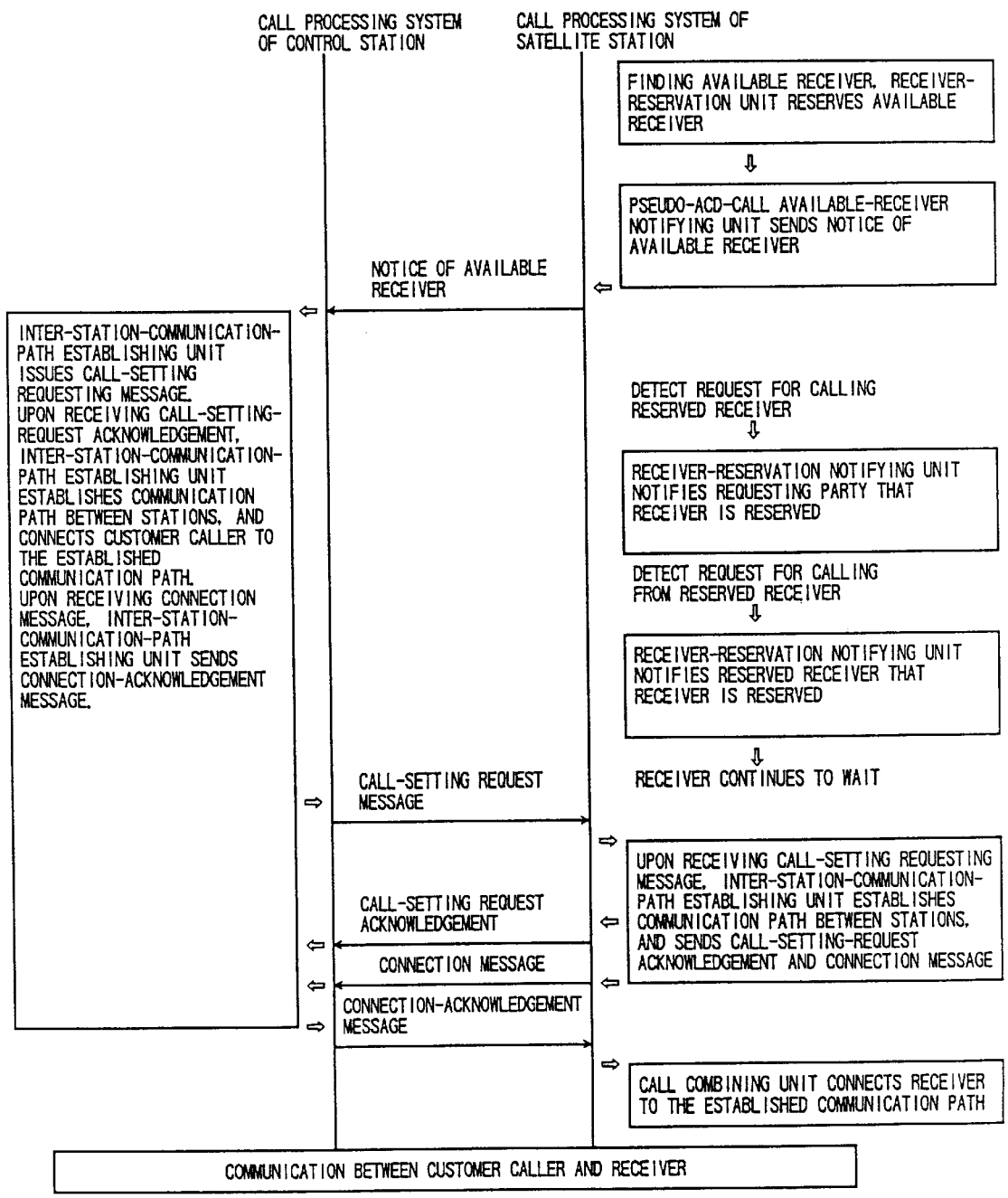
FIG. 8 is a sequence chart showing operation of call processing systems and exchange of information between a control station and a satellite station according to a fourth embodiment of the present invention.

FIG. 8 is a sequence chart showing operation of call processing systems and exchange of information between a control station and a satellite station according to a fourth embodiment of the present invention.

When a call processing system of a satellite station having performed pseudo-ACD-call placement finds an available receiver, the receiver-reservation unit 51 reserves the available receiver. When there is a request for use of this reserved receiver, the receiver-reservation notifying unit 52 notifies the requested party that the receiver is reserved. When a calling request by the reserved receiver is detected (such as when the handset is lifted), the receiver-reservation notifying unit 52 notifies the reserved receiver that the receiver is reserved for the purpose of responding to the call relating to the pseudo-ACD-call placement. While the receiver waits, the inter-station-communication-path establishing unit 54 establishes a communication path between stations. Then, the call combining unit 60 connects the receiver to the established communication path.

In this manner, the present invention reserves a receiver so as to insure that the a customer caller relating to a pseudo-ACD-call placement is reliably connected to a receiver. In this configuration, a connection between the customer caller and the receiver is secured even if the handset is lifted from the reserved receiver.

Figure 9:
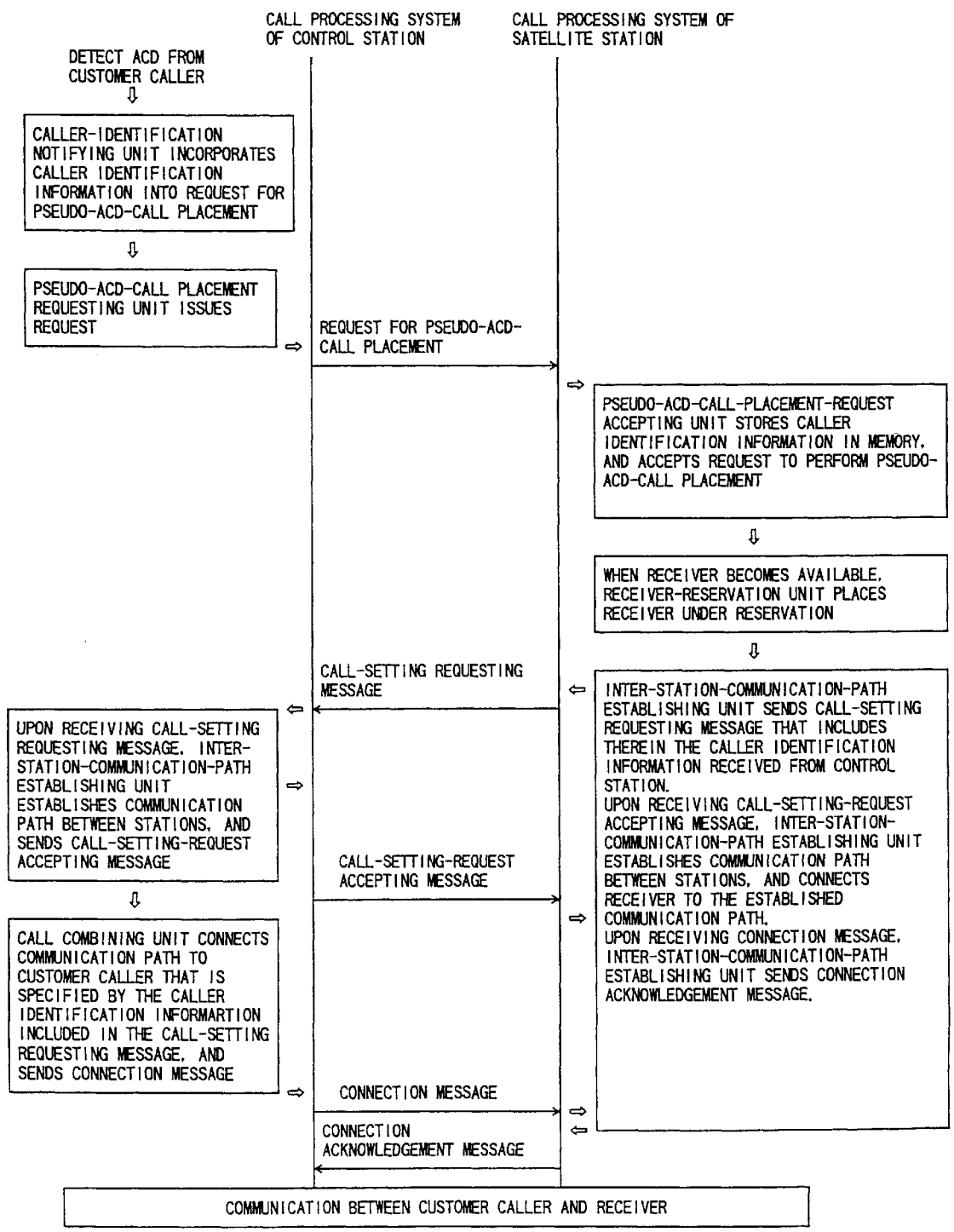
FIG. 9 is a sequence chart showing operation of call processing systems and exchange of information between a control station and a satellite station according to a fifth embodiment of the present invention.

FIG. 9 is a sequence chart showing operation of call processing systems and exchange of information between a control station and a satellite station according to a fifth embodiment of the present invention.

When a call processing system of a control station detects an ACD call from a customer caller, the caller-identification notifying unit 56 incorporates caller identification information into a request for pseudo-ACD-call placement where the caller identification information specifies the caller associated with the pseudo-ACD-call placement. The pseudo-ACD-call-placement requesting unit 45 then issues the request to a call processing system of a satellite station. Upon receiving the request from the call processing system of the control station, the call processing system of the satellite station stores the caller identification information in memory, and performs the pseudo-ACD-call placement.

When a receiver becomes available for the call processing system of the satellite station, the receiver-reservation unit 51 places the receiver under reservation. The inter-station-communication-path establishing unit 54 sends a call-setting requesting message to the call processing system of the control station where the message includes caller identification information received from the control station. Upon receiving the call-setting requesting message, the call processing system of the control station uses the inter-stationcommunication-path establishing unit 54 to establish a communication path between the stations, and a call-setting-request accepting message is sent to the call processing system of the satellite station. Upon receiving the call-setting-request accepting message, the call processing system of the satellite station uses the inter-station-communication-path establishing unit 54 to establish a communication path between the stations and to connect the receiver to the established communication path. In the call processing system of the control station, the call combining unit 60 connects the inter-station communication path to the customer caller that is specified by the caller identification information included in the call-setting requesting message. Then, the call combining unit 60 sends a connection message to the satellite station. Having received the connection message, the call processing system of the satellite station uses the inter-station-communication-path establishing unit 54 to send a connection acknowledgement message to the call processing system of the control station. In this manner, the customer caller associated with the pseudo-ACD-call placement can be connected to a receiver without using the pseudo-ACD-call available-receiver notifying unit 53.

FIG. 10 is a sequence chart showing operation of call processing systems and exchange of information between a control station and a satellite station according to a sixth embodiment of the present invention.

When a call processing system of a control station finds an available receiver or needs to terminate a pseudo-ACD call because of an abandonment of an incoming ACD call, the pseudo-ACD-call-termination-request determining unit 57 implements either a method of controlling pseudo-ACD-call placement with respect to each ACD call or a method of controlling pseudo-ACD-call placement with respect to each type of ACD call.

When the first method is selected, the pseudo-ACD-call-termination requesting unit 58 and the pseudo-ACD-call-termination accepting unit 59 terminate a pseudo-ACD call with respect to each incoming ACD call. In this case, each time an ACD call is detected, a pseudo-ACD-call placement is performed in a plurality of call processing systems of satellite stations. When a receiver is reserved in a control or satellite station and is assigned to a given ACD call, a pseudo-ACD-call placement associated to this given ACD call is terminated to complete call-wise control.

In this case, pseudo-ACD-call placement is controlled with respect to each ACD call, so that a first-in-and-first-out principle can be maintained by providing connections to incoming calls in a chronological order of incoming calls. Since pseudo-ACD-call placement needs to be performed for each incoming ACD call, a system processing load is relatively heavy with regard to processing of pseudo-ACD-call placement.

When the second method is selected, the pseudo-ACD-call-termination requesting unit 58 and the pseudo-ACD-call-termination accepting unit 59 terminate the pseudo-ACD call only when there is no ACD calls of the same type. In this case, when an ACD call is detected, a pseudo-ACD-call placement is performed in a plurality of call processing systems of satellite stations. When an ACD call is that of the same type, a request for pseudo-ACD-call placement is not issued. The call processing systems of the satellite stations keep receivers under reservation, and successively assign the receivers to the ACD calls until a request for terminating the pseudo-ACD call is issued. A request for terminating the pseudo-ACD call is made when all the ACD calls of the same type are gone in the call processing system of the control station.

In this manner, the present invention can reduce the number of pseudo-ACD-call placements, the number of occurrences of terminating operations, and the load on the system. In this case, however, the call processing systems of the satellite stations do not attend to control on an ACD-call-wise basis, so that it is impossible to assign receivers to ACD calls on a first-come-and-first-serve basis in an order of incoming ACD calls.

FIG. 11 is a sequence chart showing operation of call processing systems and exchange of information between a control station and a satellite station according to a seventh embodiment of the present invention.

In this embodiment, an ACD-call placement is performed in a call processing system of a control station, and pseudo-ACD-call placement is performed in call processing systems of satellite stations. These stations as a whole wait for a next available receiver. This configuration increases a probability of an available receiver being found for a given ACD call earlier than in the previous embodiments. When the call processing systems of satellite stations are congested or do not have a sufficient number of receivers, however, a benefit of performing a pseudo-ACD-call placement may be lost, and, also, an undue burden is imposed on the call processing systems. In consideration of this, a pseudo-ACD-call placement should be controlled so as to be performed only when it is effective under current situations regarding the congestion of a call processing system and the operation statuses of receivers. This is achieved by a control process in the following.

In a call processing system of a satellite station, the pseudo-ACD-call-placement-request accepting unit 66 receives a request for pseudo-ACD-call placement, and checks if the request can be accepted. This check is made by taking into account congestion of the system as well as operational statuses of receivers. If the request is denied, the pseudo-ACD-call-placement-request-denial notifying unit 63 issues a notice that denies the request. Upon receiving the notice of denial, the pseudo-ACD-call-placement requesting unit 45 of a call processing system of a control station confirms the denial of the request, and, then, the incoming-ACD-call waiting unit 42 waits for a next available receiver for the incoming ACD call only at the control station where the incoming call was initially detected.

Figure 12:
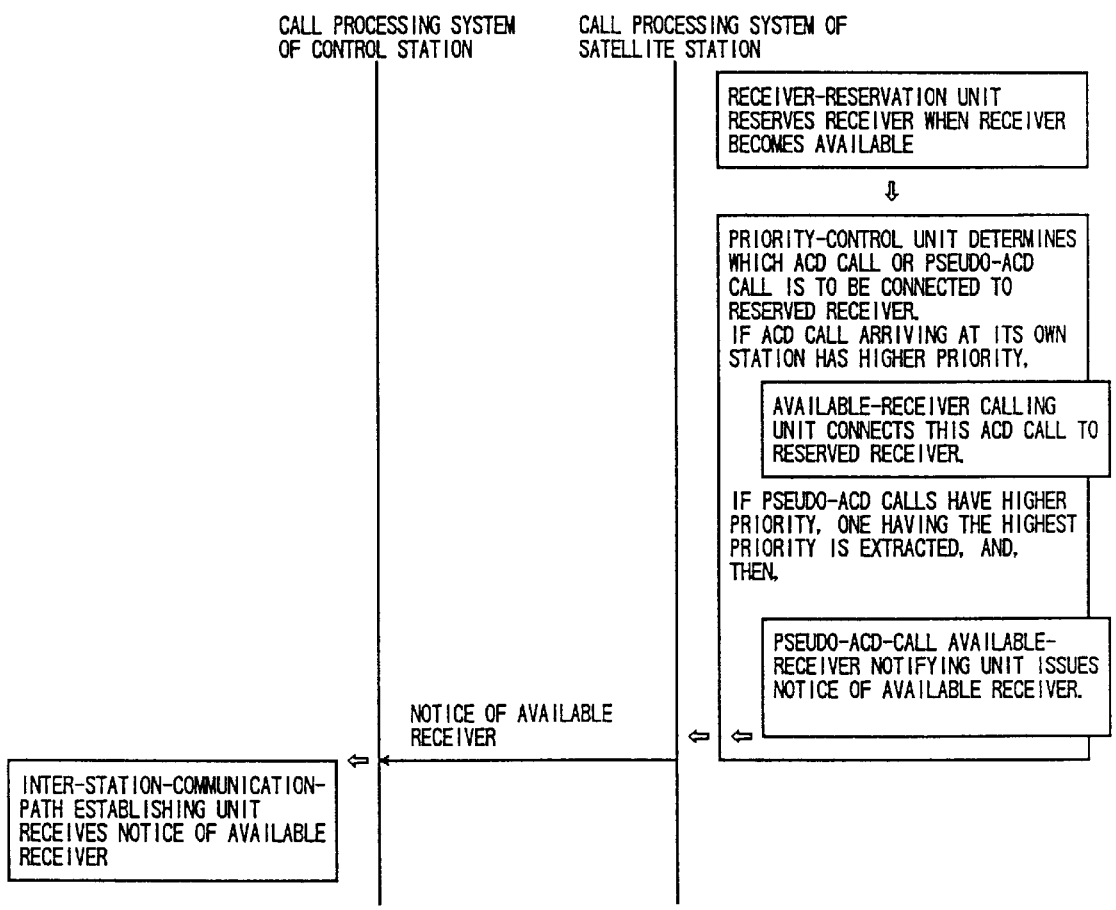
FIG. 12 is a sequence chart showing operation of call processing systems and exchange of information between a control station and a satellite station according to an eighth embodiment of the present invention.

FIG. 12 is a sequence chart showing operation of call processing systems and exchange of information between a control station and a satellite station according to an eighth embodiment of the present invention.

In FIG. 12, a call processing system of a satellite station gives priority to an ACD call arriving at its own system, and attends to handling of a pseudo-ACD call from another station only when receivers have sufficient resources for accepting such a pseudo-ACD call (e.g., when there is no ACD call arriving at its own system). To this end, priority given to the ACD call arriving at its own station is set higher than priority given to a pseudo-ACD call coming from another station. A control process as described below achieves priority control of ACD calls and pseudo-ACD calls.

In a call processing system of a satellite station, the receiver-reservation unit 51 reserves a receiver when the receiver becomes available. The priority-control unit 64 determines which ACD call or pseudo-ACD call is to be connected to the reserved receiver. Where an ACD call arriving at its own station has higher priority, the available-receiver calling unit 44 connects the ACD call to the reserved receiver. Where pseudo-ACD calls have higher priority, one having the highest priority is extracted, and, then, the pseudo-ACD-call available-receiver notifying unit 53 issues a notice of the available receiver, thereby connecting the receiver to an ACD call waiting at the call processing system of the control station.

After communication is established between an ACD call and a receiver, there may be a situation in which the ACD call may not be properly handled because of lack of skill on the part of the receiver agent or may need to be terminated because of urgent matters. In such a situation, an ACD-call placement and a pseudo-ACD-call placement need to be carried out again so as to arrange another receiver to handle the call. To this end, a control process as follows is employed to allow a receiver to arrange that a pseudo-ACD-call placement is performed at another receiver.

When a special dial or a special function button is operated at a receiver, the receiver issues a request for pseudo-ACD-call placement. In response, the pseudo-ACD-call-placement requesting unit 65 sends a request for pseudo-ACD-call placement to a call processing system of another satellite station. A procedure for performing a pseudo-ACD-call placement is identical to that of the first embodiment.

Figure 13:
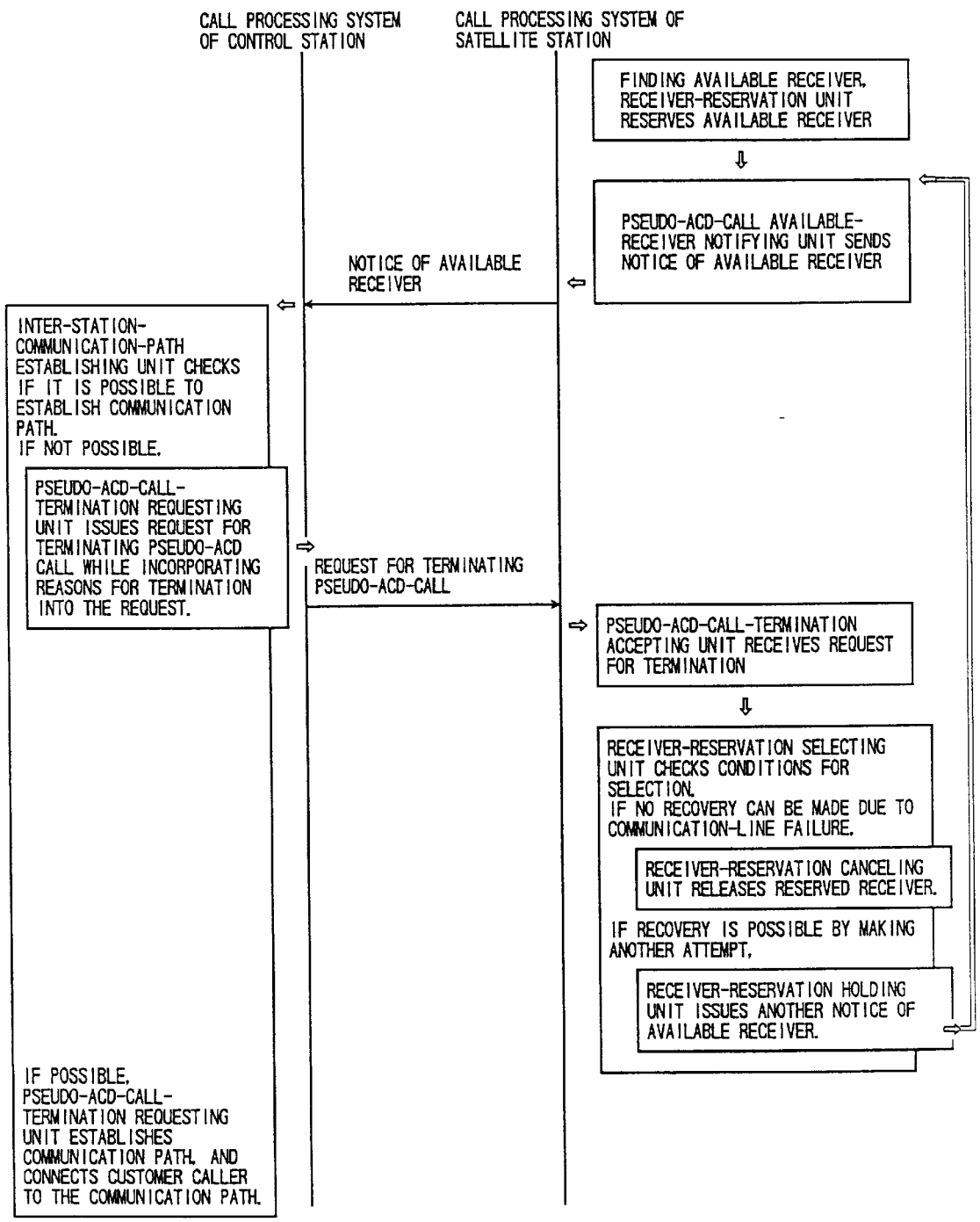
FIG. 13 is a sequence chart showing operation of call processing systems and exchange of information between a control station and a satellite station according to a ninth embodiment of the present invention.

FIG. 13 is a sequence chart showing operation of call processing systems and exchange of information between a control station and a satellite station according to a ninth embodiment of the present invention.

When a communication path needs to be established in order to connect an incoming ACD call to a reserved receiver, a call processing system of a control station or a satellite station may fail to establish the communication path. In such a case, there is no choice but to cancel the reservation for the receiver, ending up wasting the control operation that was involved in making reservation. In consideration of this, reasons for failure to establish a communication path are reported to the call processing system, so that it can be known whether reestablishment of a communication path is possible. If it is possible, the reservation is kept until a communication path is established. To this end, a control method as follows is employed.

When a notice of an available receiver is received, the inter-station-communication-path establishing unit 54 of a control station checks if an audio communication path can be established between the stations. If the check indicates that the communication path cannot be established, the pseudo-ACD-call-termination requesting unit 58 issues a request for terminating a pseudo-ACD call, and incorporates reasons for termination into the request.

When the pseudo-ACD-call-termination accepting unit 59 of the satellite station receives the request for termination, the receiver-reservation unit 51 checks conditions. If the check finds that no recovery can be made with respect to a communication-line failure or that reservation needs to be canceled, the receiver-reservation canceling unit 68 releases the reserved receiver. On the other hand, if the check finds that a recovery is possible by making another try, the reservation for the receiver is kept, and the receiver-reservation holding unit 69 issues another notice of an available receiver.

Figure 14:
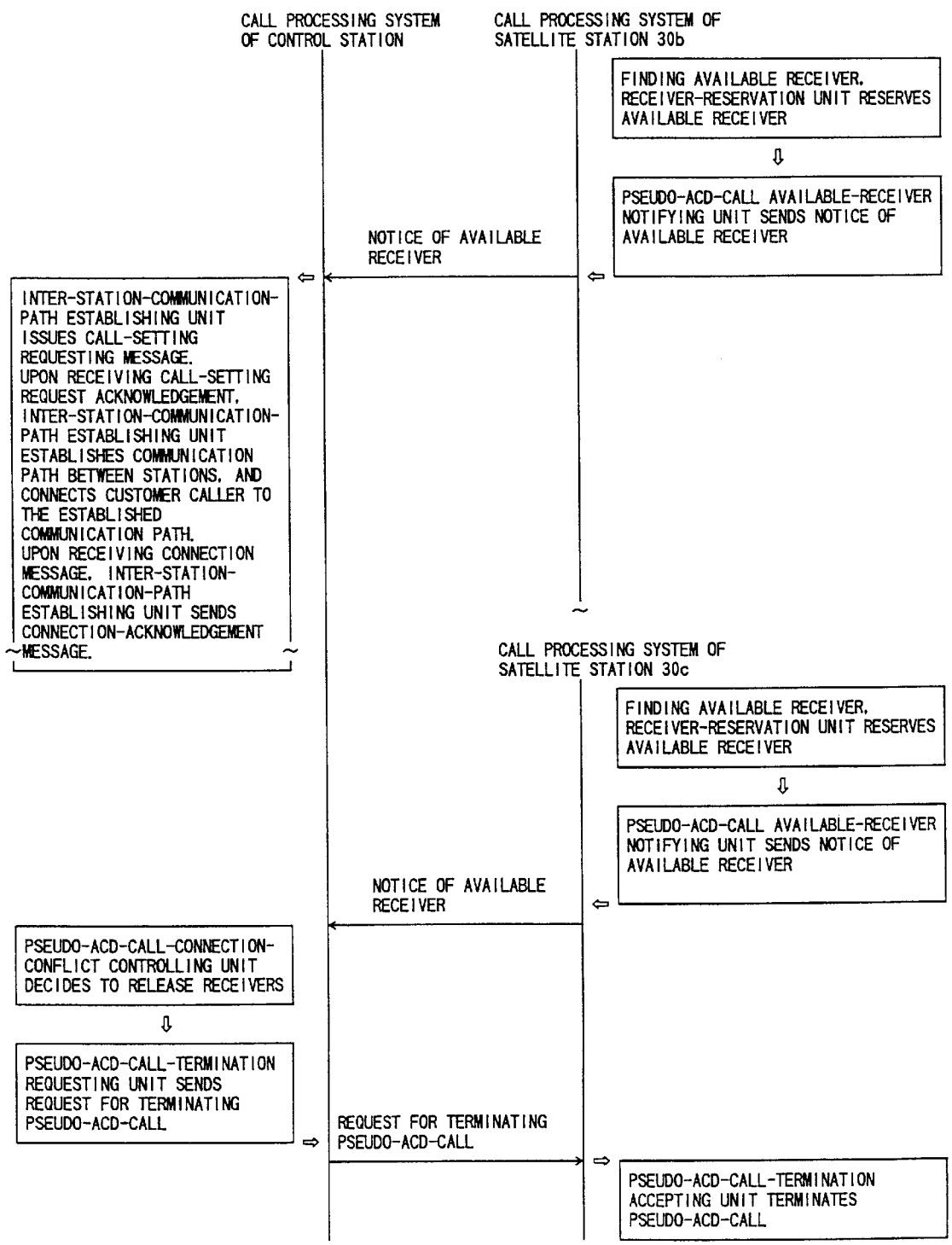
FIG. 14 is a sequence chart showing operation of call processing systems and exchange of information between a control station and a satellite station according to a tenth embodiment of the present invention.

FIG. 14 is a sequence chart showing operation of call processing systems and exchange of information between a control station and a satellite station according to a tenth embodiment of the present invention.

In FIG. 14, when a plurality of satellite stations having performed pseudo-ACD-call placement simultaneously issue a notice of an available receiver, a call processing system of a control station attends to control of conflict, and uses the pseudo-ACD-call-connection-conflict controlling unit 70 to avoid wasting use of reserved receivers which are not selected as one that receives the call. In detail, a check is made as to whether the call processing system of the control station can use the remaining reserved receivers for other incoming ACD calls. If such use is possible, the inter-station-communication-path establishing unit 54 establishes communication paths for the purpose of connecting these ACD calls to the receivers. If there is no waiting ACD call, the procedure of the sixth embodiment is performed.

Figure 15:
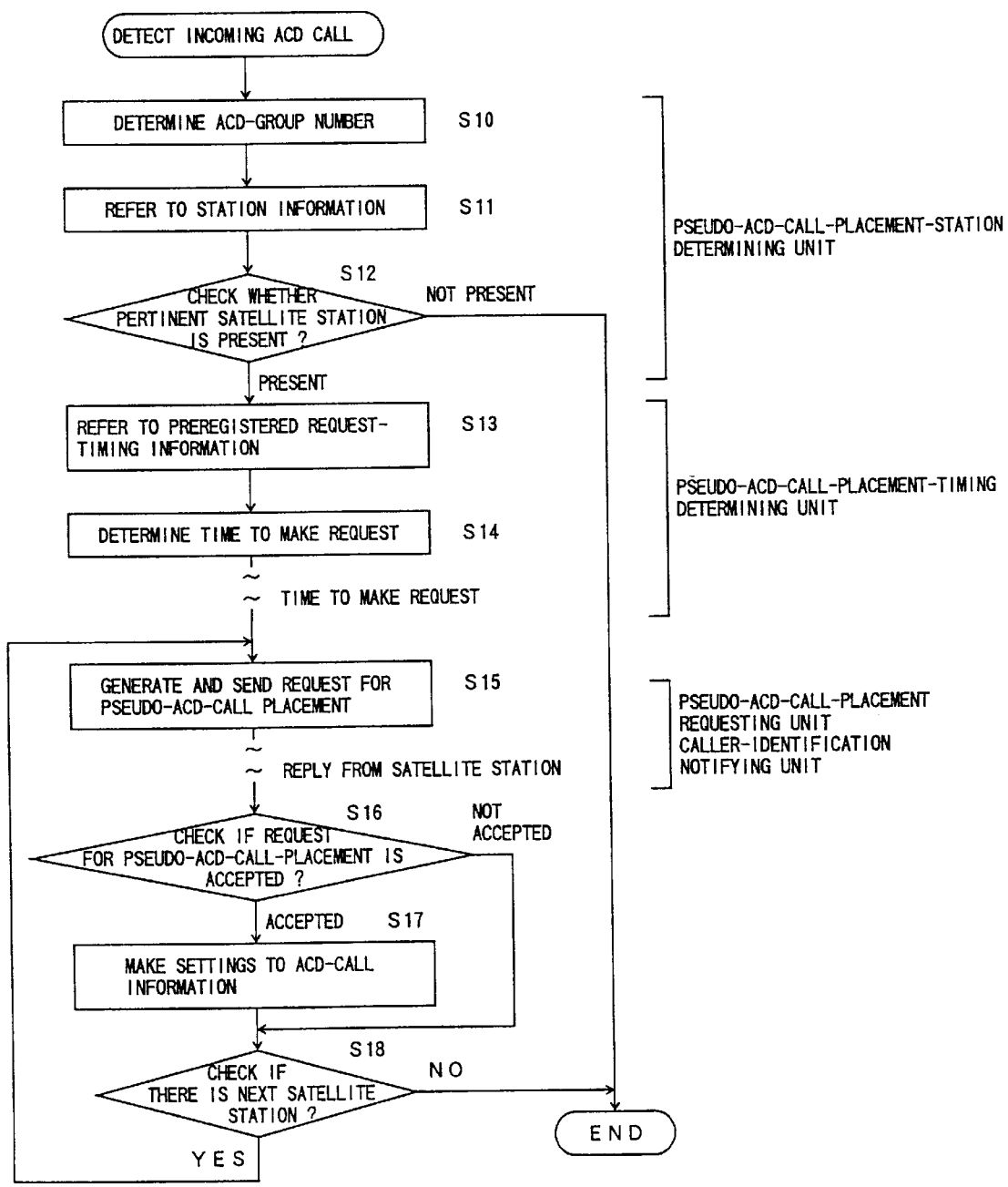
FIG. 15 is a flowchart of a process of ACD-call placement performed by a control station.

FIG. 15 is a flowchart of a process of ACD-call placement performed by a control station.

As a control station detects an ACD call, at a step S10, an ACD-group number is determined.

At a step S11, station information that is preregistered in association with the ACD-group number determined at the step S10 is referred to.

At a step S12, a check is made as to whether a pertinent satellite station is present.

The steps S10 through S12 correspond to the operation of the pseudo-ACD-call-placement-station determining unit 47.

Figure 16:
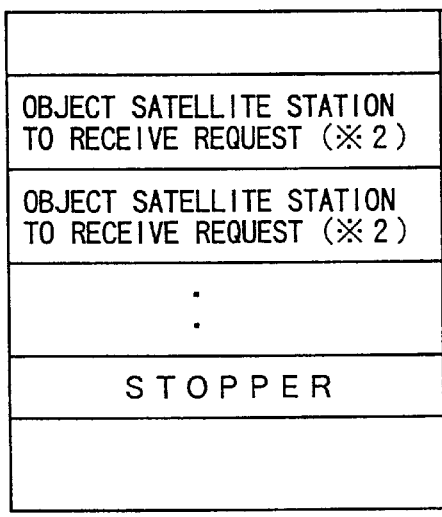
FIG. 16 is an illustrative drawing showing station information.

FIG. 16 is an illustrative drawing showing station information.

As shown in FIG. 16, satellite stations to which a request is made are registered in association with an ACD-group number. In place of the ACD-group number, an ACD-pilot number (i.e., a telephone number that received a call) or a caller identification (e.g., the caller's telephone number) may be used. In order to identify a satellite station, a pseudo-ACD-call-placement pilot number or a pseudo-ACD-call-placement group number may be used.

If the check at the step S12 finds that there is a pertinent satellite station, the procedure goes to a step S13. At the step S13, preregistered request-timing information is referred to by using the ACD-pilot number or the like.

At a step S14, a timing to make a request to the satellite station is extracted. Here, the extracted timing may indicate immediate making of a request, or may indicate a future time such as 10 seconds from the current time as may be defined in the incoming-ACD-call waiting unit 42.

The steps S13 and S14 correspond to the operation of the pseudo-ACD-call-placement-timing determining unit 49.

Figure 17:
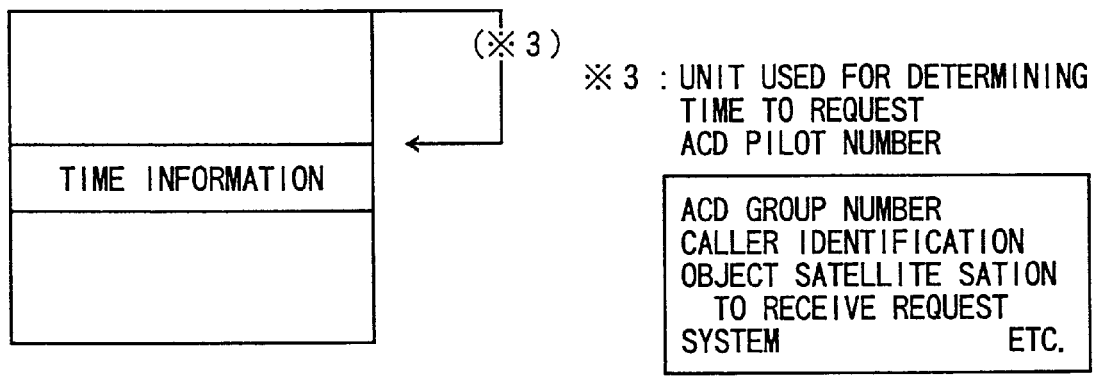
FIG. 17 is an illustrative drawing showing request-timing information.

FIG. 17 is an illustrative drawing showing request-timing information. A shown in FIG. 17, timing information is stored together with an ACD-pilot number or the like.

It should be noted that no request for pseudo-ACD-call placement is made when no request timing is specified.

Figure 19:
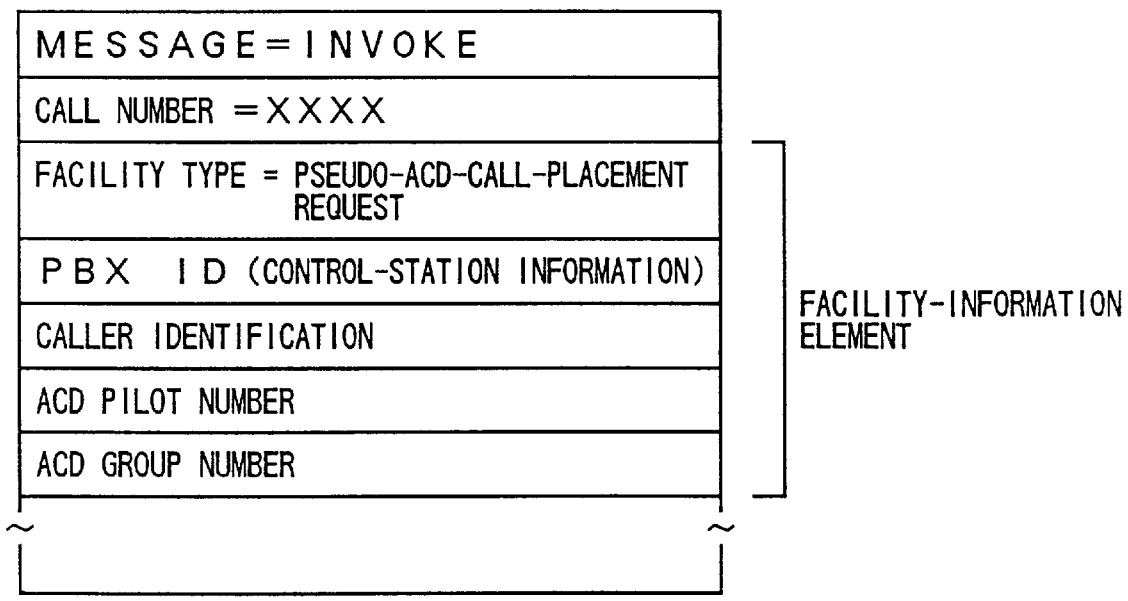
FIG. 19 is an illustrative drawing showing an INVOKE message.

With reference to FIG. 15 again, at a step S15, a request for pseudo-ACD-call placement is made when it becomes the time specified by the request timing. Here, the request is made by sending an INVOKE message as shown in FIG. 19 to the pertinent satellite station through a control channel without capturing any communication channel. In so doing, the control station information, the caller information, the ACD-pilot information, the ACD-group information, etc., are extracted from ACD-call information as shown in FIG. 18, and are incorporated into the request as appropriate.

The step S15 corresponds to the operation of the pseudo-ACD-call-placement requesting unit 45 and the caller-identification notifying unit 56. It should be noted that pseudo-ACD-call-group information of the satellite station can be specified by the control station.

At a step S16, after a response is received from the satellite station, a check is made as to whether the request for pseudo-ACD-call placement is accepted.

If it is accepted, at a step S17, settings are made to the ACD-call information.

At a step S18, a check is made as to whether there is a next satellite station. If there is, the procedure goes back to the step S15. Otherwise, the procedure comes to an end.

FIG. 20 is a flowchart of a process performed by a satellite station when the satellite station receives a request for pseudo-ACD-call placement.

Figure 21:
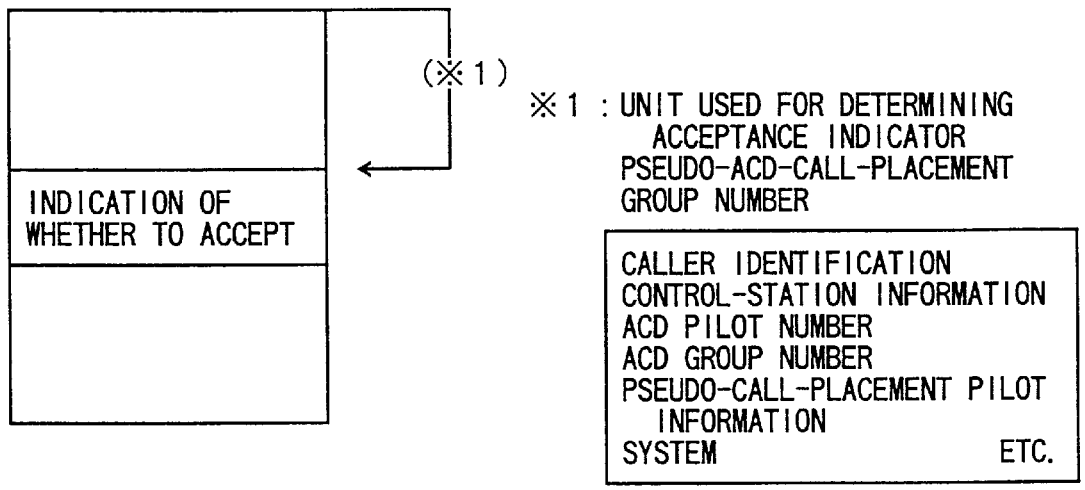
FIG. 21 is an illustrative drawing showing an acceptance indicator.

At a step S21 corresponding to the operation of the pseudo-ACD-call-placement-request-acceptance-condition registering unit 61, an acceptance indicator is registered at a satellite station. FIG. 21 is an illustrative drawing showing an acceptance indicator. As shown in FIG. 21, the acceptance indicator specifies whether to accept the request. The acceptance indicator is provided in association with an information piece serving as a unit for acceptance indicator. Such information piece includes a caller identification, a control-station identification, an incoming ACD pilot number, an incoming ACD group number, pseudo-ACD-call-placement-request pilot information, pseudo-ACD-call-placement-request group information, etc.

At a step S22, a satellite station receives a request for pseudo-ACD-call placement via a control channel.

At a step S23, a preregistered acceptance indicator is referred to by using the pseudo-ACD-call-placement-request group number or the like so as to determine whether or not to accept the request. This step corresponds to the operation of the pseudo-ACD-call-placement-request-acceptance checking unit 62.

Figure 22:
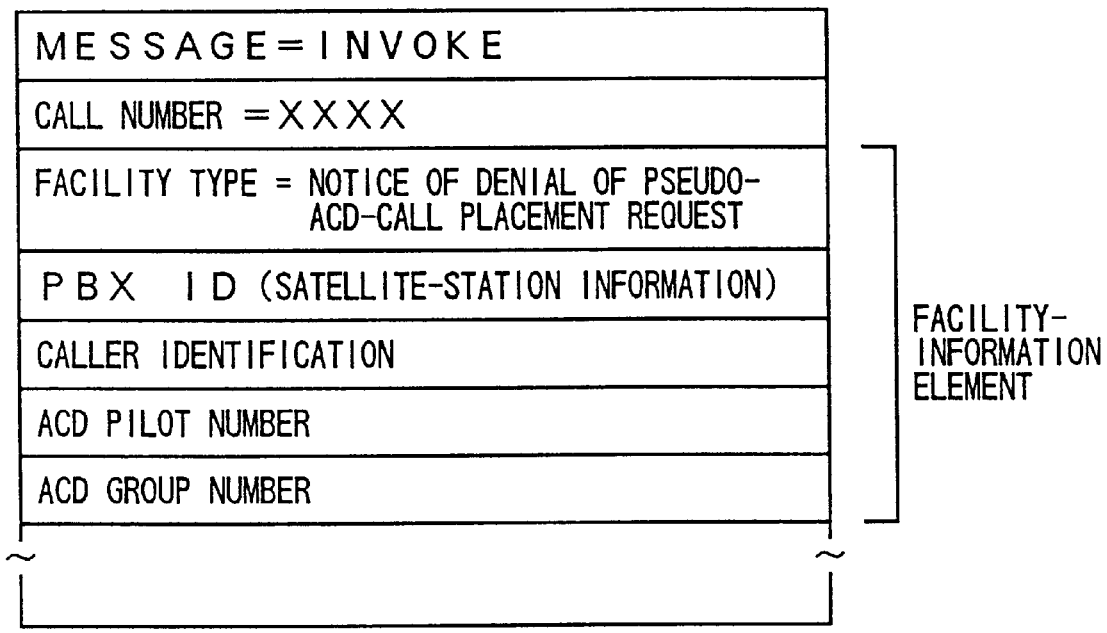
FIG. 22 is an illustrative drawing showing the contents of an INVOKEACK message.

If the acceptance indicator indicates non-acceptance, at a step S25, the satellite station sends an INVOKEACK message to the control station, indicating a denial of the request for pseudo-ACD-call placement. This message is sent via the control channel, and this step corresponds to the operation of the pseudo-ACD-call-placement-request-denial notifying unit 63. FIG. 22 is an illustrative drawing showing the contents of the INVOKEACK message. Upon receiving the message indicative of the denial, the control station refers to information on another satellite station, and continues to request the pseudo-ACD-call placement.

Figure 23:
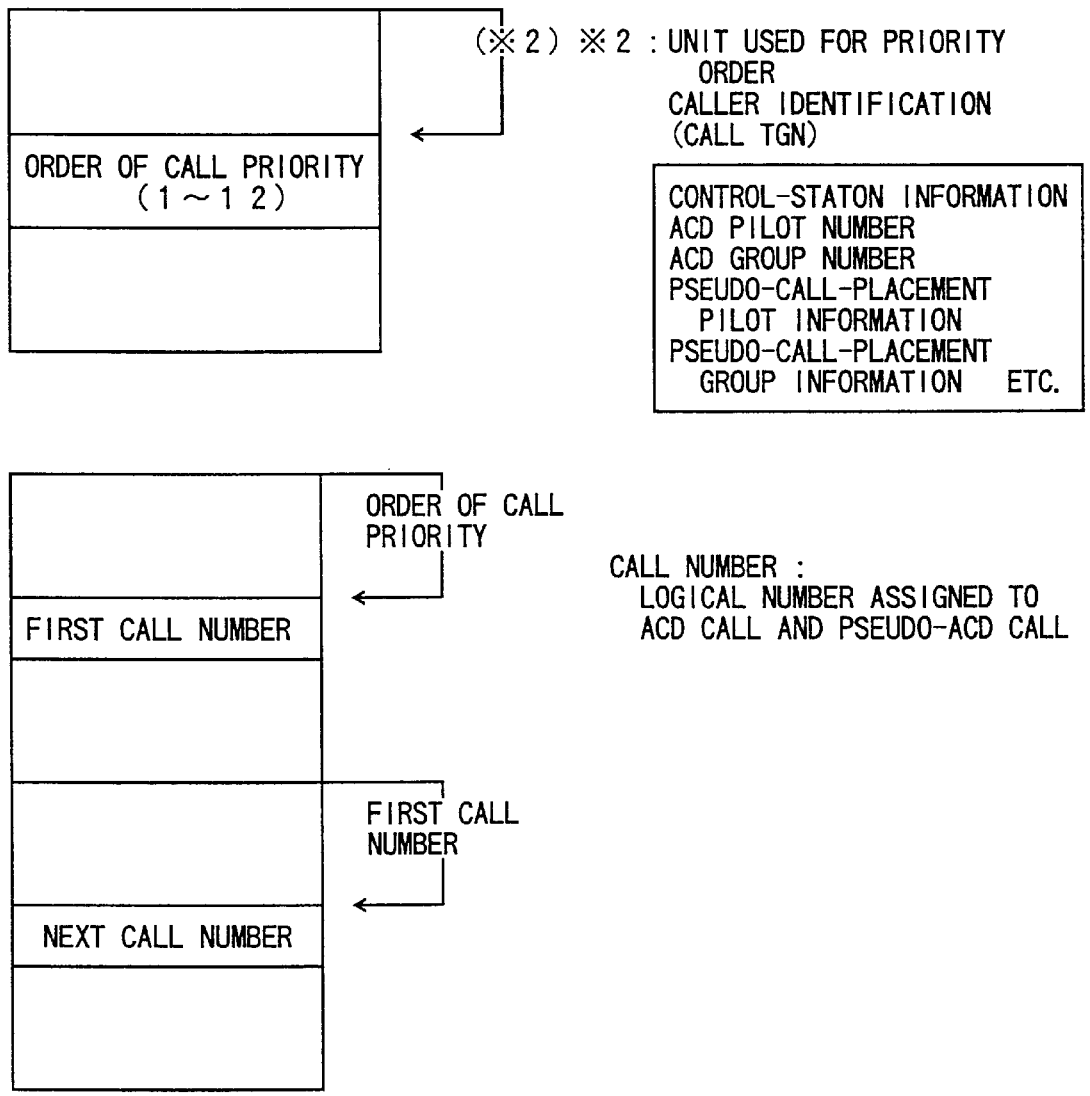
FIG. 23 is an illustrative drawing showing priority-order information.

If the acceptance indicator indicates acceptance, at a step S26, the satellite station assigns an incoming call number to the pseudo-ACD call, and determines pseudo-ACD-call-placement pilot information, pseudo-ACD-call-placement group information, etc., based on the information included in the pseudo-ACD-call-placement request. Then, the incoming call number is attached to a priority-order list by using priority-order information. FIG. 23 is an illustrative drawing showing priority-order information. The step S26 corresponds to the operation of the priority-control unit 64.

Figure 24:
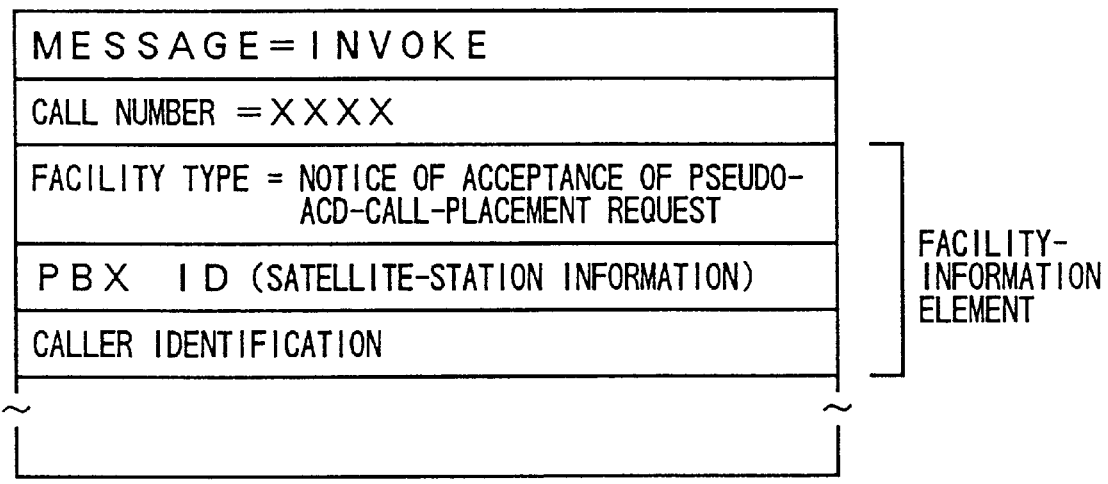
FIG. 24 is an illustrative drawing showing the contents of an INVOKEACK message.

At a step S27, acceptance of the pseudo-ACD-call-placement request is reported to the control station by using an INVOKEACK message. FIG. 24 is an illustrative drawing showing the contents of the INVOKEACK message. The step S27 corresponds to the pseudo-ACD-call-placement-request-acceptance notifying unit 48. It should be noted that the processing of an incoming call can be performed with respect to the pseudo-ACD-call-placement pilot information or the pseudo-ACD-call-placement group information.

Having received the notice accepting the request, the control station registers information about the satellite station in the ACD-call information. After this, the control information refers to information about a next satellite station, and continues the process of requesting pseudo-ACD-call placement.

Figure 25:
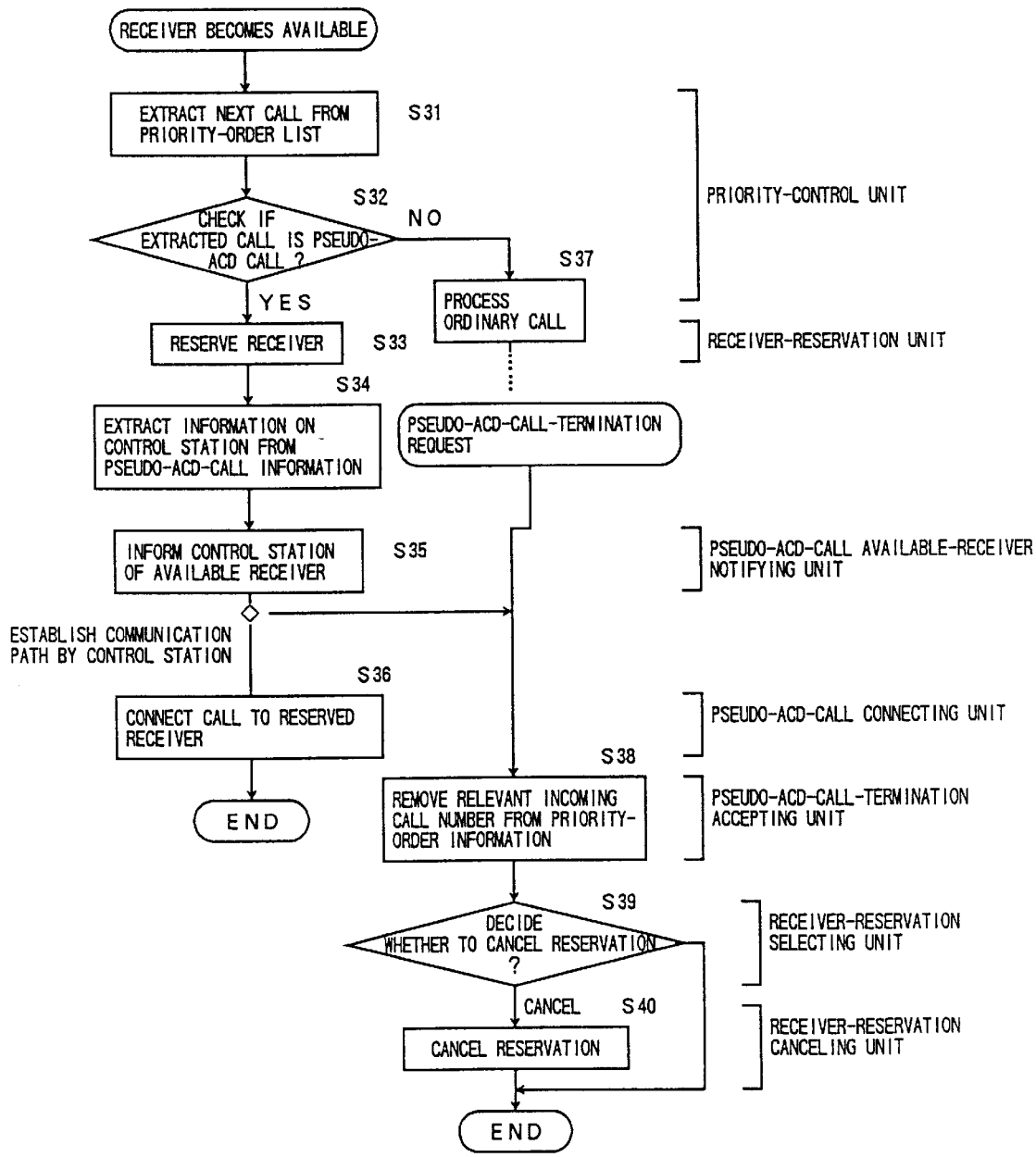
FIG. 25 is a flowchart of a process performed by a satellite station when a receiver becomes available.

FIG. 25 is a flowchart of a process performed by a satellite station when a receiver becomes available.

When a receiver becomes available in a satellite station, the available-receiver extracting unit 43 learns this fact.

At a step S31, a next call is extracted from the priority-order list.

At a step S32, a check is made as to whether the extracted call is a pseudo-ACD call. If it is not, the procedure goes to a step S37 to perform processing for an ordinary call. If the extracted call is a pseudo-ACD call, the procedure goes to a step S33.

At the step S33, the receiver that has become available is reserved. This process corresponds to the operation of the receiver-reservation unit 51.

At a step S34, information on the control station is extracted from the pseudo-ACD-call information by using the incoming call number.

Figure 26:
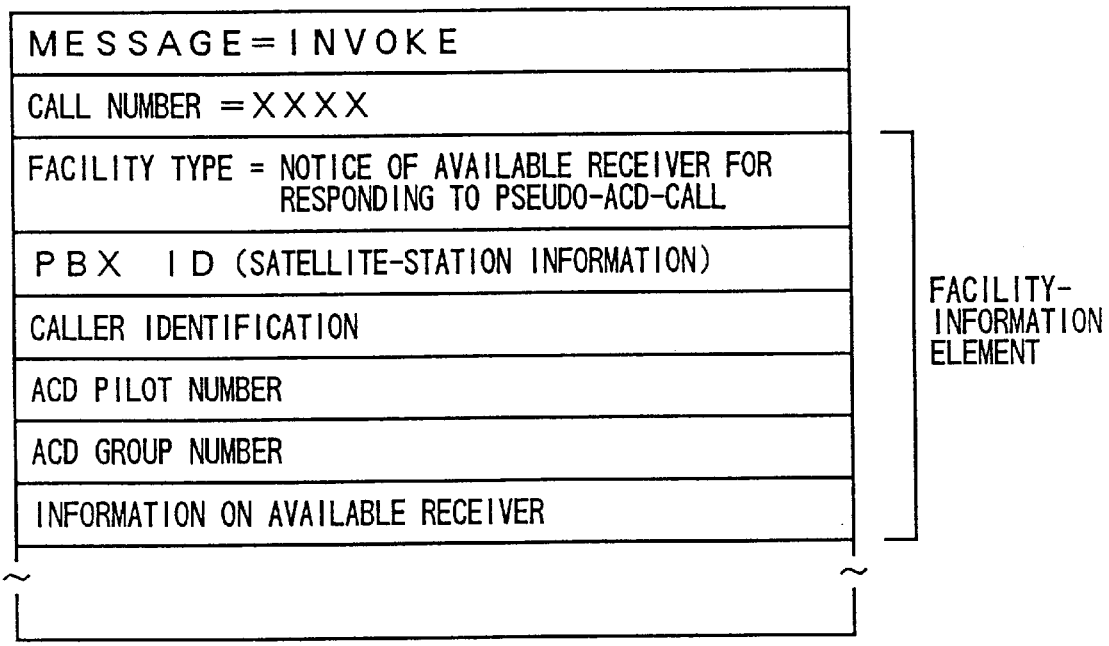
FIG. 26 is an illustrative drawing showing the contents of an INVOKE message.

At a step S35, the control station is informed of the available receiver by an INVOKE message sent via the control channel. FIG. 26 is an illustrative drawing showing the contents of the INVOKE message. This process corresponds to the operation of the pseudo-ACD-call available-receiver notifying unit 53.

Upon receiving the INVOKE message, the control station captures a communication channel based on the information included in the INVOKE message, thereby establishing a communication path with the satellite station.

When the communication path is established, at a step S36, the call is connected to the reserved receiver. This process corresponds to the operation of the pseudo-ACD-call connecting unit 55. If the receiver is in transmission operation, the call combining unit 60 needs to combine calls.

If the capturing of a communication channel or the establishment of a communication path fails, the procedure goes to a step S38 in the same manner as when a request for terminating a pseudo-ACD call is issued. At the step S38, the relevant incoming call number is removed from the priority-order information, and information on the pseudo-ACD-call placement is eliminated. This process corresponds to the operation of the pseudo-ACD-call-termination accepting unit 59.

At a step S39, a decision is made as to whether to cancel the reservation for the receiver. This step corresponds to the operation performed by the receiver-reservation selecting unit 67.

If cancellation is a selected option, at a step S40, the for the receiver is canceled. This corresponds to the operation performed by the receiver-reservation canceling unit 68. If cancellation is not selected, the receiver will be kept under reservation.

Figure 27:
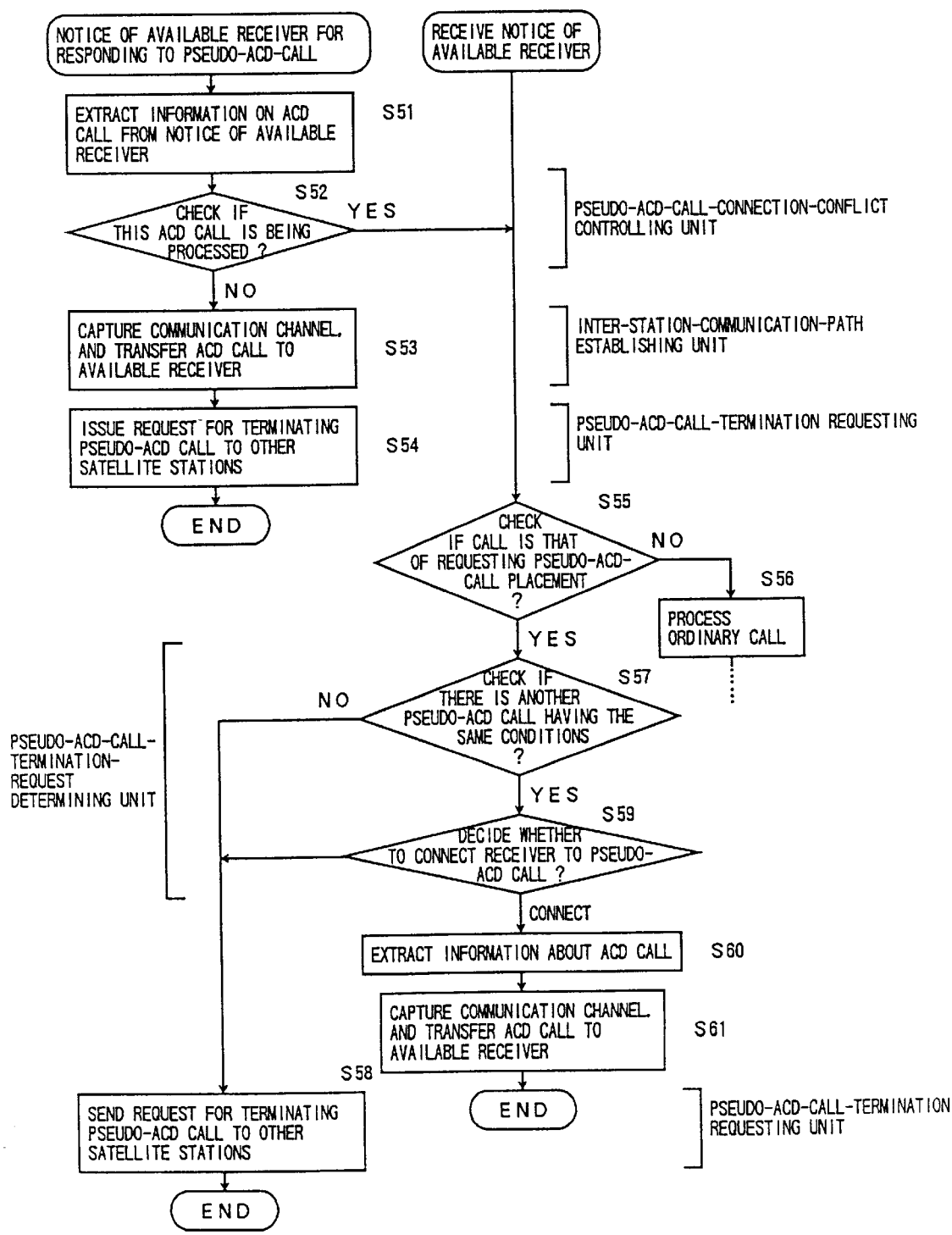
FIG. 27 is a flowchart of a process performed by a control station when the control station receives a notice of an available receiver.

FIG. 27 is a flowchart of a process performed by a control station when the control station receives a notice of an available receiver.

When the control station receives a notice of a receiver available for processing a pseudo-ACD call, at a step S51, the control station extracts information on the ACD call from the notice of the available receiver.

At a step S52, a check is made as to whether this ACD call is being processed (e.g., already served by another receiver). This corresponds to the operation performed by the pseudo-ACD-call-connection-conflict controlling unit 70.

If the ACD call is not being processed, at a step S53, a communication cannel is captured by utilizing the information on the ACD call, thereby establishing a communication path with the satellite station. This step corresponds to the operation of the inter-station-communication-path establishing unit 54.

Figure 28:
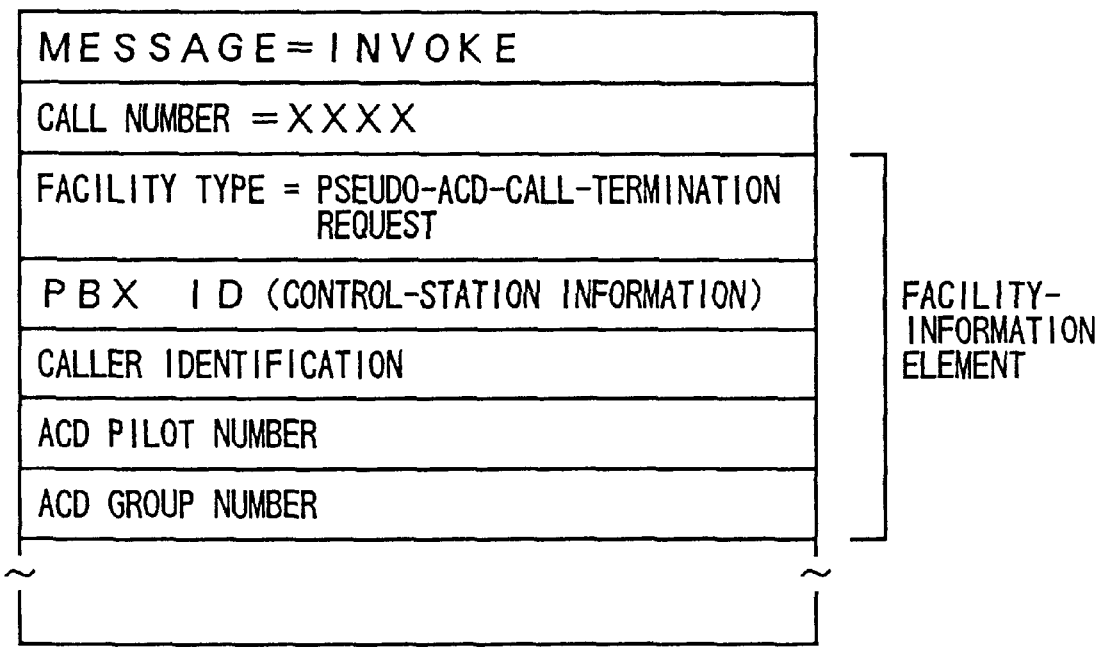
FIG. 28 is an illustrative drawing showing the contents of an INVOKE message.

At a step S54, the control station issues a request for termination of the pseudo-ACD call to other relevant satellite stations by sending an INVOKE message via a control channel. FIG. 28 is an illustrative drawing showing the contents of the INVOKE message. This step corresponds to the operation of the pseudo-ACD-call-termination requesting unit 58.

When a plurality of satellite stations have available receivers at the same time, all of these satellite stations send the INVOKE message to the control station via the control channel so as to notify of the available receivers. In response, the control station connects the call to the satellite station that came first. As for the satellite stations that came after the first satellite station, the control station may connect these satellite stations to other incoming ACD calls having the same conditions. Alternatively, the control station cancels the receiver reservations. When the latter option is taken, at the step S54, the control station sends the request for terminating pseudo-ACD call to the satellite stations.

At a step S55 which is performed when the step S52 finds that the call is being processed or when the caller terminates the call, a check is made as to whether the call is that of requesting a pseudo-ACD-call placement. If it is not, the procedure goes to a step S56, where processing for an ordinary call is performed. Otherwise, the procedure goes to a step S57.

At the step S57, a check is made as to whether there is another pseudo-ACD call having the same conditions as the call being processed.

If there is no such pseudo-ACD call, at a step S58, information is extracted from the ACD-call information as shown in FIG. 18. The extracted information may include information about the source that requested pseudo-ACD-call placement, control-station information, caller information, incoming-ACD-call pilot information, incoming-ACD-call group information, etc. The control station then sends a request for terminating the pseudo-ACD call to the relevant satellite station. This is done in actuality by sending an INVOKE message as shown in FIG. 28 via a control channel. This operation corresponds to that of the pseudo-ACD-call-termination requesting unit 58.

If the check at the step S57 finds that there is another pseudo-ACD call having the same conditions as the call being processed, the procedure goes to a step S59.

At the step S59, a decision is made as to whether the receiver is to be connected to the pseudo-ACD call found at the step S57. The process of the step S59 corresponds to the operation of the pseudo-ACD-call-termination-request determining unit 57. If the receiver is not to be connected, the procedure goes to the step S58. If the receiver is to be connected, the procedure goes to a step S60.

At the step S60, information about the ACD call is extracted.

At a step S61, a communication channel is captured based on the information about the ACD call so as to establish a communication path with the satellite station, and the ACD call is transferred to the available receiver.

Figure 29:
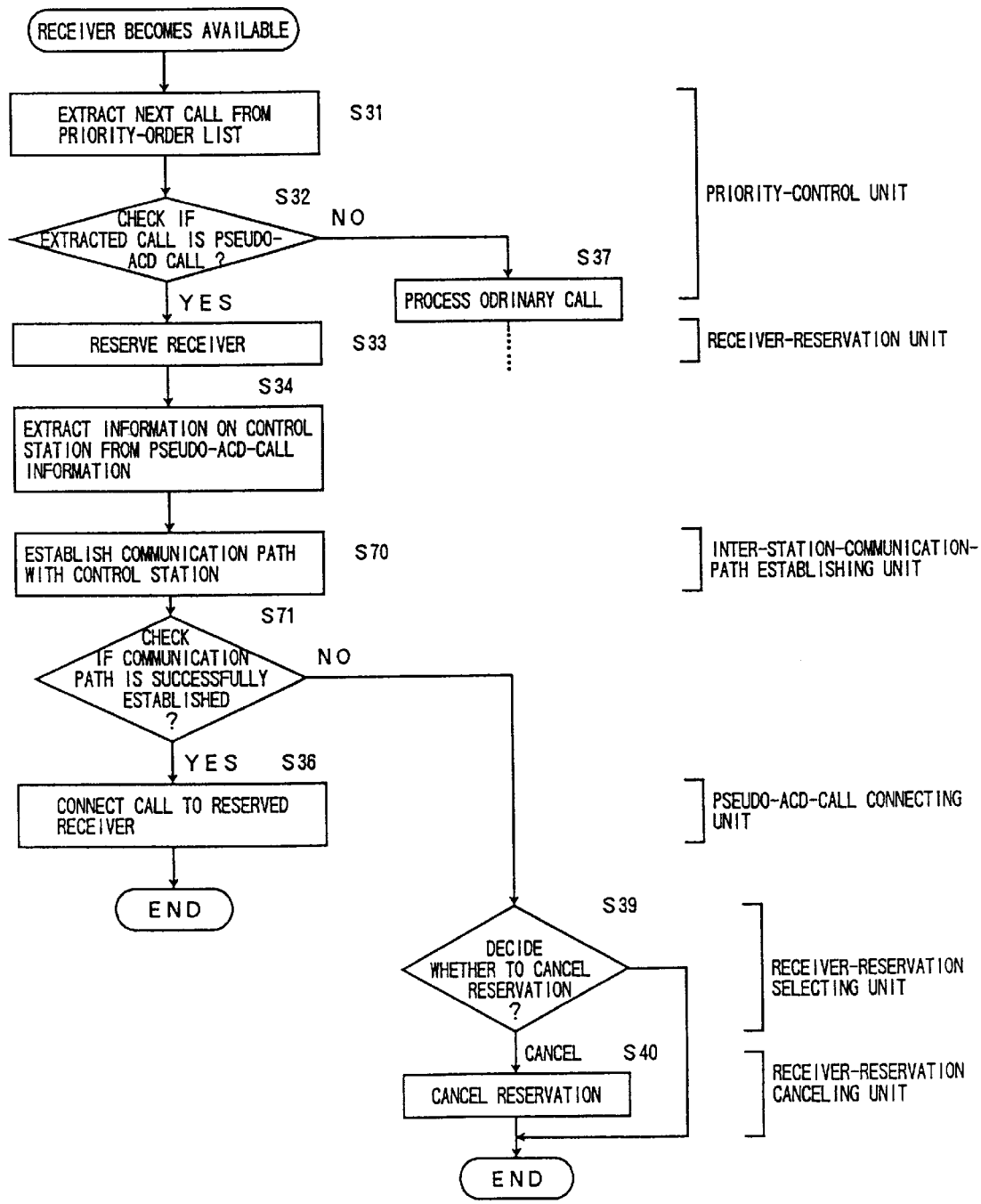
FIG. 29 is a flowchart of a variation of a process performed by a satellite station when a receiver becomes available.

FIG. 29 is a flowchart of a variation of a process performed by the satellite station when a receiver becomes available. In FIG. 29, the same steps as those of FIG. 25 are referred to by the same numerals.

When a receiver becomes available in a satellite station, the available-receiver extracting unit 43 learns this fact.

At a step S31, a next call is extracted from the priority-order list.

At a step S32, a check is made as to whether the extracted call is a pseudo-ACD call. If it is not, the procedure goes to a step S37 to perform processing for an ordinary call. If the extracted call is a pseudo-ACD call, the procedure goes to a step S33.

At the step S33, the receiver that has become available is reserved. This process corresponds to the operation of the receiver-reservation unit 51.

At a step S34, information on the control station is extracted from pseudo-ACD-call information by using the incoming call number. FIG. 30 is an illustrative drawing showing the contents of the pseudo-ACD-call information.

At a step S70 after the step S34, a communication path is established between the satellite station and the control station. This process corresponds to the operation performed by the inter-station-communication-path establishing unit 54.

When the communication path is established, the call and other relevant calls relating to the caller are combined, and are engaged in busy communication.

At a step S71, a check is made as to whether the communication path is successfully established. If it is, the procedure goes to a step S36.

At the step S36, the call is connected to the reserved receiver, and is engaged in busy communication. This process corresponds to the operation of the pseudo-ACD-call connecting unit 55.

If the check at the step S71 finds that the establishment of a communication path is not successful, the procedure goes to a step S39.

At the step S39, a decision is made as to whether to cancel the reservation for the receiver. This step corresponds to the operation performed by the receiver-reservation selecting unit 67.

If cancellation is a selected option, at a step S40, the reservation for the receiver is canceled. This corresponds to the operation performed by the receiver-reservation canceling unit 68. If cancellation is not selected, the receiver will be kept under reservation.

Figure 31:
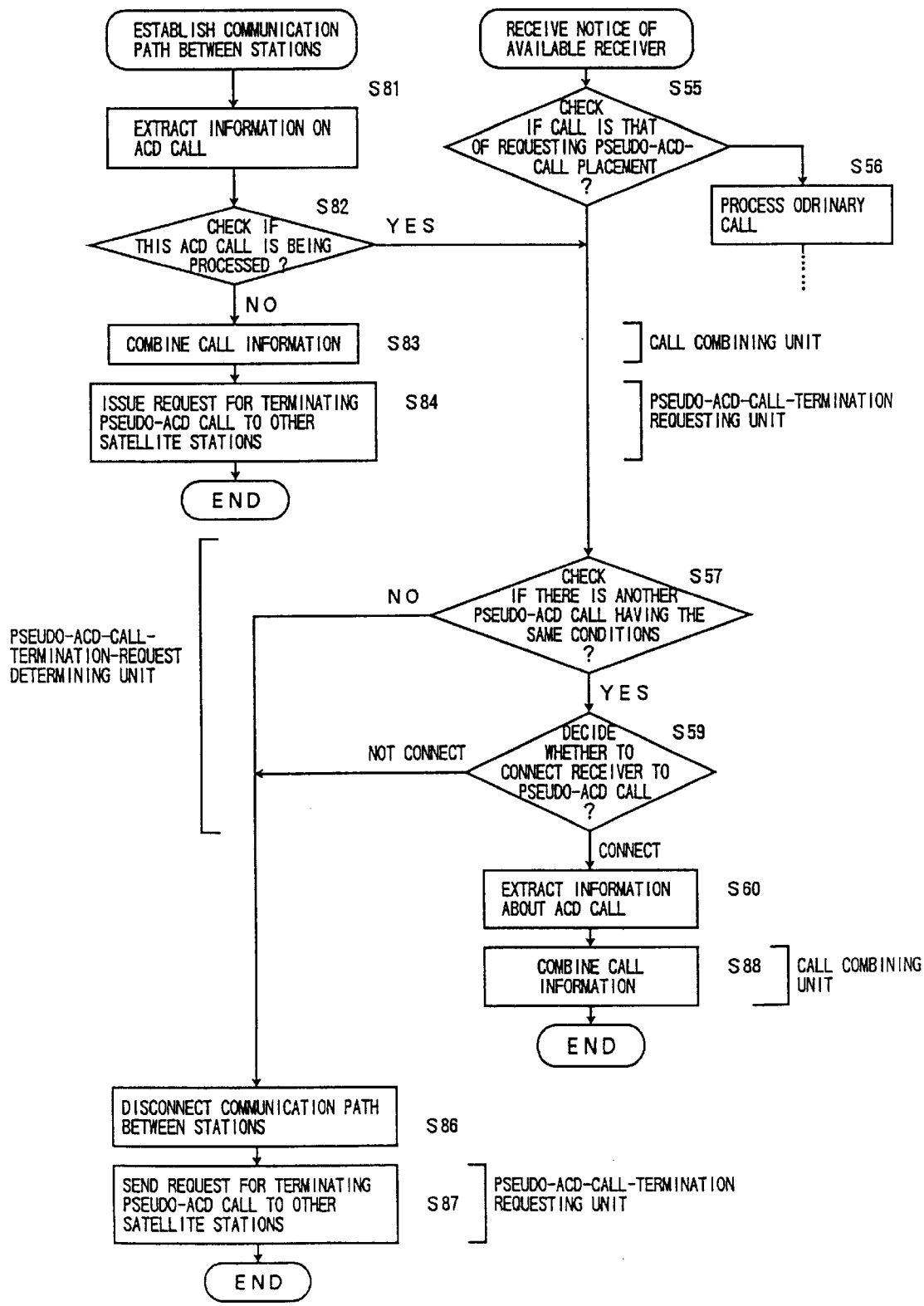
FIG. 31 is a flowchart of a process performed by a control station when the control station receives a notice of establishment of communication path.

FIG. 31 is a flowchart of a process performed by a control station when the control station receives a notice of establishment of communication path. In FIG. 31, the same steps as those of FIG. 27 are referred to by the same numerals.

Upon receiving a notice of communication-path establishment, at a step S81, the control station extracts information on the ACD call from the received notice.

At a step S82, a check is made as to whether this ACD call is being processed.

If the ACD call is not being processed, at a step S83, call information is combined. This step corresponds to the operation of the call combining unit 60.

At a step S84, the control station issues a request for termination of pseudo-ACD call to other relevant satellite stations. This step corresponds to the operation of the pseudo-ACD-call-termination requesting unit 58.

When a plurality of satellite stations have available receivers at the same time, all of these satellite stations capture communication channels that are connected to the control station, thereby establishing communication paths. In response, the control station connects the call to the satellite station that came first. As for the satellite stations that came after the first satellite station, the control station may connect these satellite stations to other incoming ACD calls having the same conditions. Alternatively, the control station cancels the receiver reservations at these satellite stations. It is when the latter option is taken that, at the step S84, the control station sends the request for terminating a pseudo-ACD call to the satellite stations.

At a step S55 which is performed when the caller terminates the call, a check is made as to whether the call is that of requesting a pseudo-ACD-call placement. If it is not, the procedure goes to a step S56, where processing for an ordinary call is performed. Otherwise, the procedure goes to a step S57.

At the step S57, which is performed also when the step S82 finds that the call is being processed, a check is made as to whether there is another pseudo-ACD call having the same conditions as the call being processed.

If there is no such pseudo-ACD call, at a step S86, the communication path is disconnected. Then, at a step S87, a request for terminating pseudo-ACD call is transmitted. The step S87 corresponds to the pseudo-ACD-call-termination requesting unit 58.

If the check at the step S57 finds that there is another pseudo-ACD call having the same conditions as the call being processed, the procedure goes to a step S59.

At the step S59, a decision is made as to whether the receiver is to be connected to the pseudo-ACD call found at the step S57. The process of the step S59 corresponds to the operation of the pseudo-ACD-call-termination-request determining unit 57. If the receiver is not to be connected, the procedure goes to the step S86. If the receiver is to be connected, the procedure goes to a step S60.

At the step S60, information about the ACD call is extracted.

At a step S88, call information is combined. This corresponds to the operation of the call combining unit 60.

Figure 32:
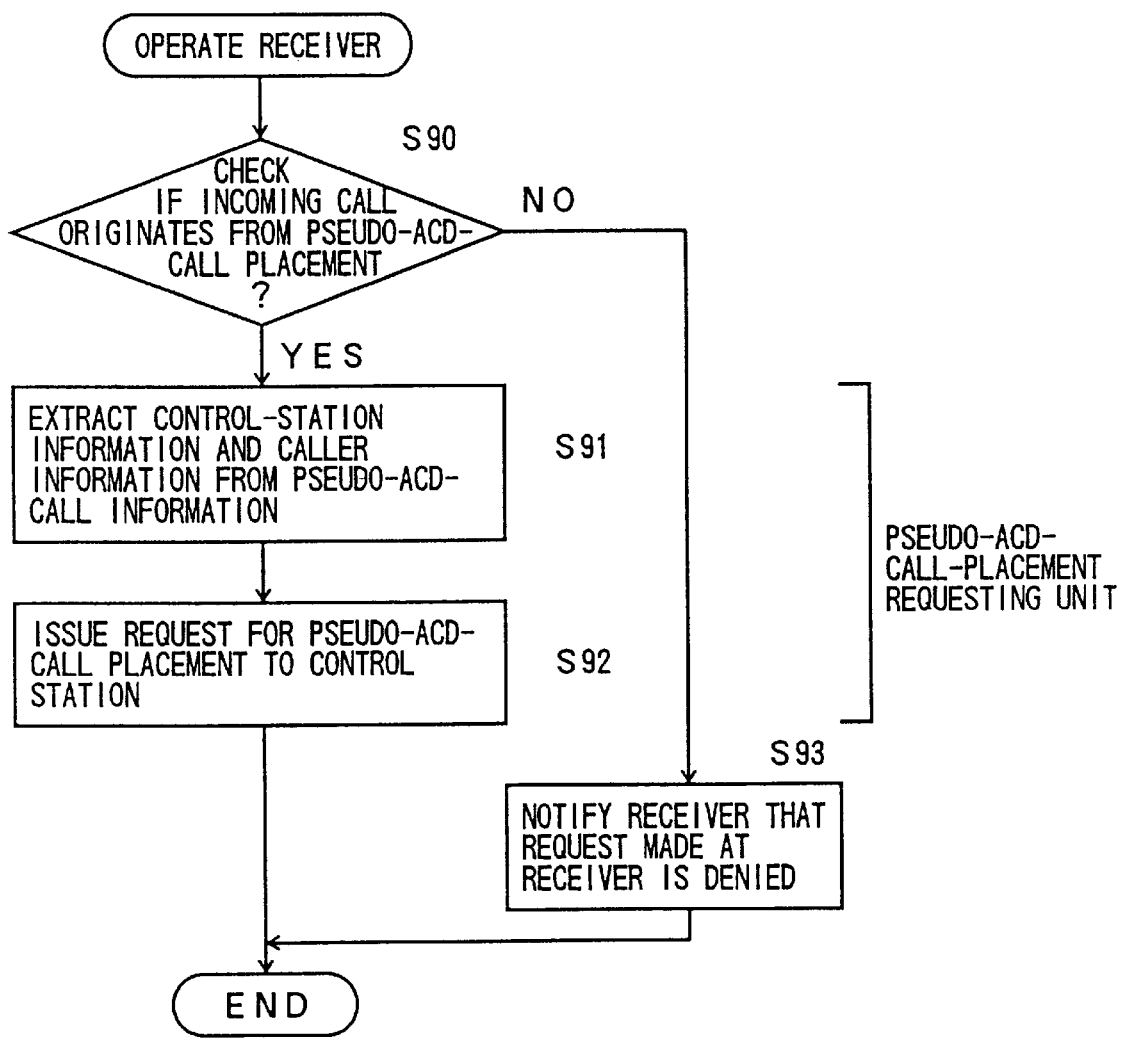
FIG. 32 is a flowchart of a process performed by a satellite station when a receiver is operated.

FIG. 32 is a flowchart of a process performed by a satellite station when a receiver is operated.

The process of FIG. 32 is performed when a request operation is performed on a receiver, such request operation including pressing of a button and entering of an incoming-ACD-pilot number or lifting a handset off hock and entering of a special number as well as an incoming-ACD-pilot number.

At a step S90, a check is made as to whether the call on line is a call originating from a pseudo-ACD-call placement.

If the call originates from a pseudo-ACD-call placement, at a step S91, the control-station information and the caller information are extracted from the pseudo-ACD-call information.

Figure 33:
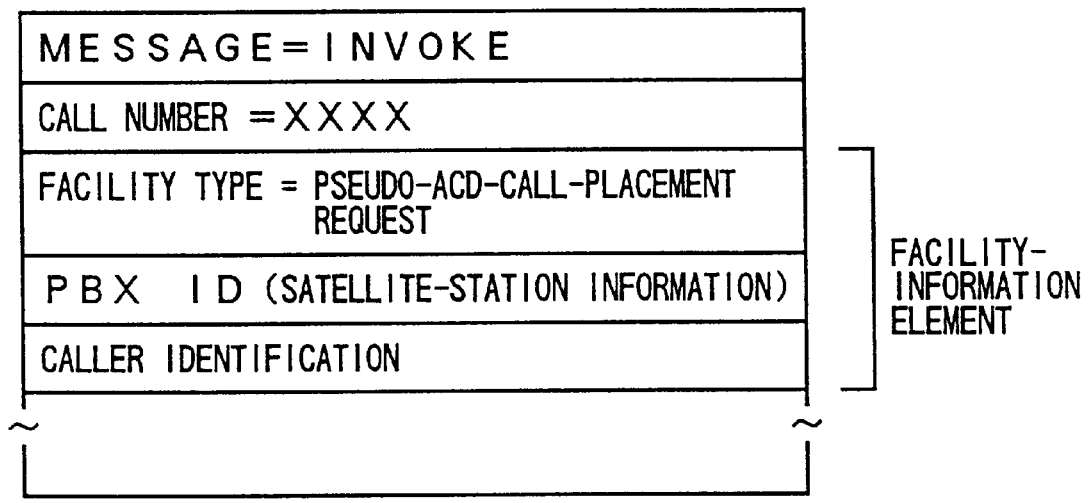
FIG. 33 is an illustrative drawing showing the contents of an INVOKE message.

At a step S92, a request for pseudo-ACD-call placement is issued to the control station by sending an INVOKE message via a control channel. FIG. 33 is an illustrative drawing showing the contents of the INVOKE message. The process performed at the steps S91 and S92 corresponds to the operation of the pseudo-ACD-call-placement requesting unit 65.

If the check at the step S90 finds that the call on line is an ordinary call, the procedure goes to a step S93, where the receiver is notified that the request made at the receiver is denied.

Figure 34:
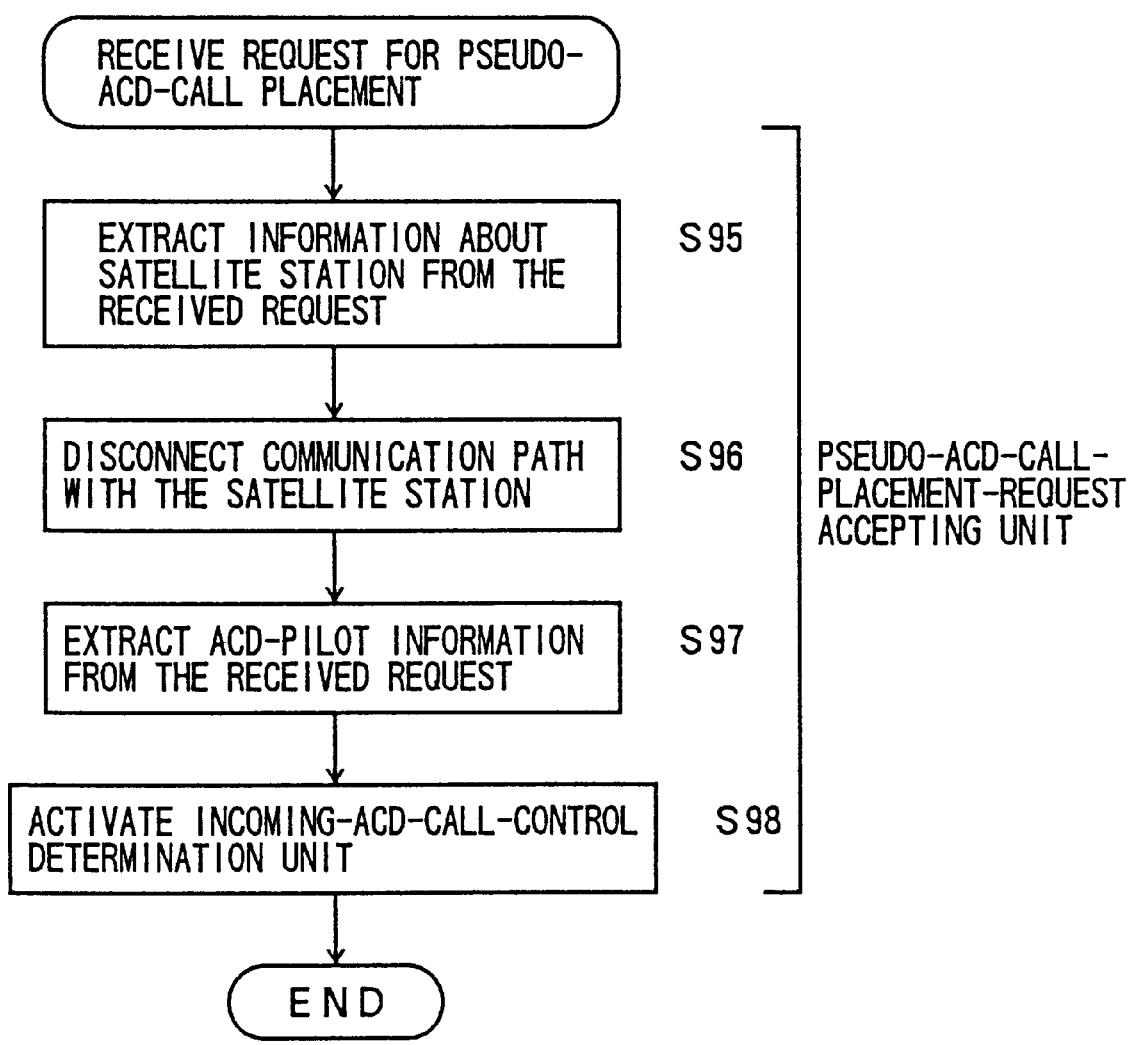
FIG. 34 is a flowchart of a process performed by a control station when the control station receives a request for pseudo-ACD-call placement.

FIG. 34 is a flowchart of a process performed by a control station when the control station receives a request for pseudo-ACD-call placement.

At a step S95, information about the satellite station is extracted from the received request for pseudo-ACD-call placement.

At a step S96, a communication path with the satellite station is disconnected.

At a step S97, ACD-pilot information is extracted from the received request for pseudo-ACD-call placement.

At a step S98, the incoming-ACD-call-control determination unit 41 is activated to perform another ACD-call placement. The steps S95 through S98 correspond to the operation performed by the pseudo-ACD-call-placement-request accepting unit 46.

Figure 35:
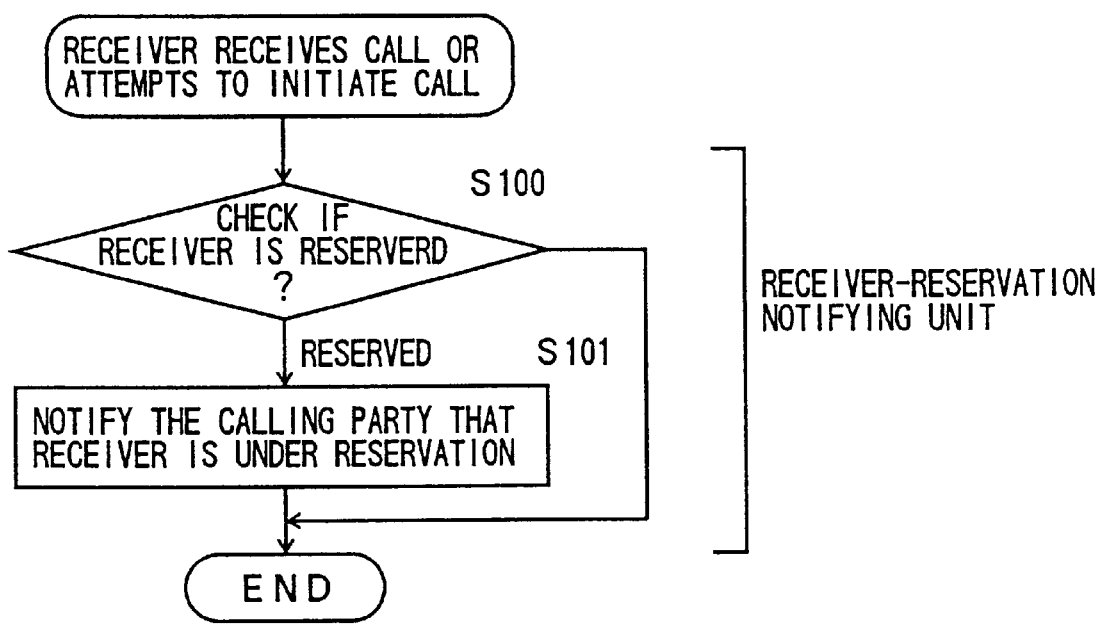
FIG. 35 is a flowchart of a process performed by a satellite station when a receiver receives a call or attempts to initiate a call.

FIG. 35 is a flowchart of a process performed by a satellite station when a receiver receives a call or attempts to initiate a call.

At a step S100, a check is made as to whether the receiver receiving a call or attempting to initiate a call is a reserved receiver.

If the receiver is a reserved receiver, at a S101, an agent using this receiver or a caller calling this receiver is notified that the receiver is under reservation. This is indicated by a voice message, a warning sound, an LED display, a lamp sign, or the like. This process corresponds to the operation of the receiver-reservation notifying unit 52.

As described above, the present invention places pseudo-ACD-call placement in queues of all the call processing systems or ACD groups when a call arrives at a call processing system in a network of call processing systems. When any receiver accepts the call, the pseudo-ACD calls are removed from all the queues. In this configuration, awaiting of a receiver can be arranged without reducing efficiency of use of communication paths between the call processing systems in the network, and, also, the processing load can be distributed to all the ACD groups in the network. This configuration insures that the caller is taken care of in a relatively short time period.

Moreover, the present invention requires only the call processing systems connected with each other, and does not need other devices such as workstations. Namely, the present invention can insures a shorter waiting period and a distribution of the processing load without requiring a large investment in facility.

When a receiver becomes available but the call is already processed by another receiver, pseudo-ACD calls in queues are not terminated if there is another ACD call having the same conditions. This facilitates a prompt service to a next incoming ACD call.

Further, the present invention is not limited to these embodiments, but various variations and modifications may be made without departing from the scope of the present invention.

The present application is based on Japanese priority application No. 11-012408 filed on Jan. 20, 1999 with the Japanese patent office, the entire contents of which are hereby incorporated by reference.

What is claimed is:

1. A system for controlling automatic call distribution service in a network in which call processing systems are connected via a control channel and a communication channel, comprising:

a pseudo-ACD-call-placement requesting unit which sends a request for pseudo-ACD-call placement from a control station to satellite stations via the control channel in response to a real incoming call, wherein the control station is one of the call processing systems that receives said real incoming call from an exterior of the network, and satellite stations are the call processing systems other than the control station;

a pseudo-ACD-call-placement-request accepting unit which accepts the request at the satellite stations so that a pseudo-ACD call is placed in queue in the satellite stations; and an inter-station-communication-path establishing unit which establishes a real communication path to be used for said real incoming call via the communication channel between the control station and one of the satellite stations when the one of the satellite stations has an available receiver to respond to the pseudo-ACD call placed in the queue thereof.

2. The system as claimed in claim 1, further comprising:
a pseudo-ACD-call-placement-station determining unit which selects the call processing systems that are to serve as the satellite stations to receive the request; and
a pseudo-ACD-call-placement-request-acceptance notifying unit which is provided in each satellite station, and notifies the control station of acceptance of the request when the request is accepted.

3. The system as claimed in claim 1, further comprising a pseudo-ACD-call-placement-timing determining unit which determines a timing at which the request is sent from the control unit to the satellite stations.

4. The system as claimed in claim 1, further comprising a receiver-reservation unit which reserves the receiver so as to prevent use of the receiver for purposes other than a purpose of responding to the pseudo-ACD call.

5. The system as claimed in claim 4, further comprising a receiver-reservation notifying unit which indicates a reserved status of the receiver when use of the receiver for purposes other than a purpose of responding to the pseudo-ACD call is attempted.

6. The system as claimed in claim 1, further comprising:
a pseudo-ACD-call available-receiver notifying unit which is provided in each satellite station, and notifies the control station of receiver availability when the satellite station has an available receiver to respond to the pseudo-ACD call; and
a pseudo-ACD-call connecting unit which activates said inter-station-communication-path establishing unit to establish the real communication path between the control station and said one of the satellite stations when said pseudo-ACD-call available-receiver notifying unit thereof notifies the control station of receiver availability, and which connects the real incoming call to the receiver via the real communication path.

7. The system as claimed in claim 1, further comprising:
a caller-identification notifying unit which is provided in the control station, and includes a caller identification of a caller in the request for pseudo-ACD-call placement;
a call combining unit which activates said inter-station-communication-path establishing unit to establish the real communication path between the control station and said one of the satellite stations when said one of the satellite stations has the available receiver to respond to the pseudo-ACD call, and which connects the real incoming call of the caller to the available receiver.

8. The system as claimed in claim 1, further comprising:
a pseudo-ACD-call-termination-request determining unit which selects whether to request termination of pseudo-ACD calls to the satellite stations where the pseudo-ACD calls are placed in queue;
a pseudo-ACD-call-termination requesting unit which sends a pseudo-ACD-call-termination request to the satellite stations; and a pseudo-ACD-call-termination accepting unit which is provided in each satellite station, and accepts the pseudo-ACD-call-termination request so as to terminate a pseudo-ACD call in the satellite station.

9. The system as claimed in claim 1, further comprising:
a pseudo-ACD-call-placement-request-acceptance-condition registering unit which is provided in each satellite station, and registers an acceptance indicator indicative of whether to accept the request;
a pseudo-ACD-call-placement-request-acceptance checking unit which is provided in each satellite station, and checks the acceptance indicator to determine whether the satellite station accepts the request; and
a pseudo-ACD-call-placement-request-denial notifying unit which is provided in each satellite station, and notifies the control station of denial of the request if the satellite station denies the request.

10. The system as claimed in claim 1, further comprising a priority-control unit which determines which call is to be connected to the available receiver.

11. The system as claimed in claim 1, wherein said pseudo-ACD-call-placement requesting unit issues a request for pseudo-ACD-call placement when a receiver on line demands placement of a pseudo-ACD call.

12. The system as claimed in claim 4, further comprising:
a receiver-reservation selecting unit which selects whether to keep the reservation for the receiver;
a receiver-reservation canceling unit which cancels the reservation according to the selection made by said receiver-reservation selecting unit; and
a receiver-reservation holding unit which keeps the reservation according to the selection made by said receiver-reservation selecting unit.

13. The system as claimed in claim 6, further comprising a pseudo-ACD-call-connection-conflict controlling unit which is activated when the control station is notified of availability of one or more receivers in addition to said receiver from one or more of the satellite stations, and determines whether to release said one or more receivers or to utilize said one or more receivers for processing of other ACD calls.

14. The system as claimed in claim 5, wherein the use of the receiver for purposes other than a purpose of responding to the pseudo-ACD call includes use of the receiver for initiating a call, and the reserved status of the receiver is indicated at the receiver.

15. A method of controlling automatic call distribution service in a network in which call processing systems are connected via a control channel and a communication channel, comprising the steps of:
sending a request for pseudo-ACD-call placement from a control station to satellite stations via the control channel in response to a real incoming call, wherein the control station is one of the call processing systems that receives said real incoming call from an exterior of the network, and satellite stations are the call processing systems other than the control station;
placing a pseudo-ACD call in queue in the satellite stations in response to the request; and
establishing a real communication path to be used for said real incoming call via the communication channel between the control station and one of the satellite stations when the one of the satellite stations has an available receiver to respond to the pseudo-ACD call placed in the queue thereof.

* * * * *